US012283150B2

(12) United States Patent
Higgins et al.

(10) Patent No.: US 12,283,150 B2
(45) Date of Patent: Apr. 22, 2025

(54) METHODS AND DEVICES FOR PROVIDING MACHINE SURFACE COLORS AND ANIMATIONS BASED ON TRIGGER EVENTS

(71) Applicant: IGT, Las Vegas, NV (US)

(72) Inventors: Kevin Higgins, Reno, NV (US); Dwayne Nelson, Las Vegas, NV (US)

(73) Assignee: IGT, Las Vegas, NV (US)

( * ) Notice: Subject to any disclaimer, the term of this patent is extended or adjusted under 35 U.S.C. 154(b) by 239 days.

(21) Appl. No.: 17/895,765

(22) Filed: Aug. 25, 2022

(65) Prior Publication Data

US 2024/0071164 A1 Feb. 29, 2024

(51) Int. Cl.
*G07F 17/32* (2006.01)

(52) U.S. Cl.
CPC ...... *G07F 17/3211* (2013.01); *G07F 17/3209* (2013.01); *G07F 17/3216* (2013.01); *G07F 17/3267* (2013.01)

(58) Field of Classification Search
CPC ............. G07F 17/3211; G07F 17/3216; G07F 17/3227
See application file for complete search history.

(56) References Cited

U.S. PATENT DOCUMENTS

| | | | | |
|---|---|---|---|---|
| 8,147,334 | B2 | 4/2012 | Gatto et al. | |
| 8,764,566 | B2 | 7/2014 | Miltenberger et al. | |
| 10,474,311 | B2 * | 11/2019 | Clemons | G06F 3/0481 |
| 2005/0261046 | A1 * | 11/2005 | Griswold | G07F 17/3211 463/16 |
| 2011/0207525 | A1 * | 8/2011 | Allen | G07F 17/3244 463/25 |

OTHER PUBLICATIONS

"Electronic Ink Film," E Ink Holdings Inc., 2020, 10 pages [retrieved online Nov. 28, 2022 from: www.eink.com/e-ink-film.html].
Hawkins "BMW debuts its new color-changing paint technology at CES: E Ink," The Verge, Jan. 5, 2022, 23 pages [retrieved online from: www.theverge.com/2022/1/5/22867090/bmw-color-changing-paint-electric-car-ces].

* cited by examiner

*Primary Examiner* — Jasson H Yoo
(74) *Attorney, Agent, or Firm* — Sheridan Ross P.C.

(57) ABSTRACT

A gaming device includes a frame, a display, and an electronic-ink film that is attached to various exterior surfaces of the frame. As a trigger event occurs, the appearance state of the electronic-ink film is dynamically changed to provide a specific color or animation output. This output changes an appearance of the exterior surfaces of the frame and the gaming device in general. The trigger events correspond to gameplay events, player activity, and a state of the gaming device.

20 Claims, 9 Drawing Sheets

METHODS AND DEVICES FOR PROVIDING MACHINE SURFACE COLORS AND ANIMATIONS BASED ON TRIGGER EVENTS

BACKGROUND

The present disclosure is generally directed to gaming systems and, in particular, toward gaming machines with trigger-based surface animations and color changes.

Gaming machines can include various lights or displays that are capable of presenting an entertaining gaming experience to a player. Any type of device or system that can enhance the overall gaming experience is often viewed as desirable and can lead to increased play of the gaming machine.

BRIEF SUMMARY

In certain embodiments, the present disclosure relates to an electronic gaming machine, or gaming device, including a frame comprising exterior surfaces of the gaming device; a display device disposed at least partially in the frame, the display device comprising an outer periphery, wherein a viewing area of the display device is disposed inside the outer periphery; an electronic-ink film attached to at least one surface of the exterior surfaces of the gaming device, the electronic-ink film arranged outside of the viewing area of the display device, wherein a state of the electronic-ink film defines an appearance of the exterior surfaces of the gaming device; a processor coupled to the display device and the electronic-ink film; and a memory coupled with and readable by the processor and storing therein instructions that, when executed by the processor, cause the processor to: render, via the display device, images associated with a game of the gaming device; determine, based on an occurrence of a state-change triggering event, a change in the appearance of the exterior surfaces of the gaming device; and send, based on the change in the appearance determined, a first voltage signal to the electronic-ink film, wherein the first voltage signal alters an electric charge of the electronic-ink film at a first time that changes the state of the electronic-ink film from a first state comprising a first appearance to a second state comprising a second appearance, and wherein the second appearance is different from the first appearance causing the change in the appearance of the exterior surfaces of the gaming device.

In some embodiments, a method is provided, comprising: rendering, by a display device of a gaming device, images associated with a game of the gaming device, wherein the images are rendered to a viewing area of the display device that is disposed inside an outer periphery of the display device; rendering, by an electronic-ink film attached to at least one exterior surface of the gaming device, a first appearance of the at least one exterior surface of the gaming device when the electronic-ink film is in a first state; determining, by a processor of the gaming device, an occurrence of a state-change triggering event for an appearance of the at least one exterior of the gaming device; determining, by the processor based on the occurrence of the state-change triggering event determined, a change in the appearance of the at least one exterior surface of the gaming device; sending, by the processor based on the change in the appearance determined, a first voltage signal to the electronic-ink film that changes an electric charge of the electronic-ink film and causes a change in state from the first state of the electronic-ink film to a second state of the electronic-ink film; and rendering, by the electronic-ink film, a second appearance of the at least one exterior surface of the gaming device when the electronic-ink film is in the second state, wherein the second appearance is different from the first appearance causing the change in the appearance of the exterior surface of the gaming device.

In some embodiments, a gaming device is provided, comprising: a frame defining exterior surfaces of the gaming device; a display device operatively attached to the frame; and an electronic-ink film overlaying the exterior surfaces of the gaming device and surrounding a portion of the display device, wherein the electronic-ink film is separate from the display device, wherein the electronic-ink film comprises electronic-ink particles sandwiched between two opposing film layers of the electronic-ink film, wherein a charge of the electronic-ink particles defines an appearance of the gaming device that is rendered by the electronic-ink film, wherein the electronic-ink film dynamically changes between appearance states based on state-change triggering events received by the gaming device.

Additional features and advantages are described herein and will be apparent from the following Description and the figures.

DETAILED DESCRIPTION

Figure 1:
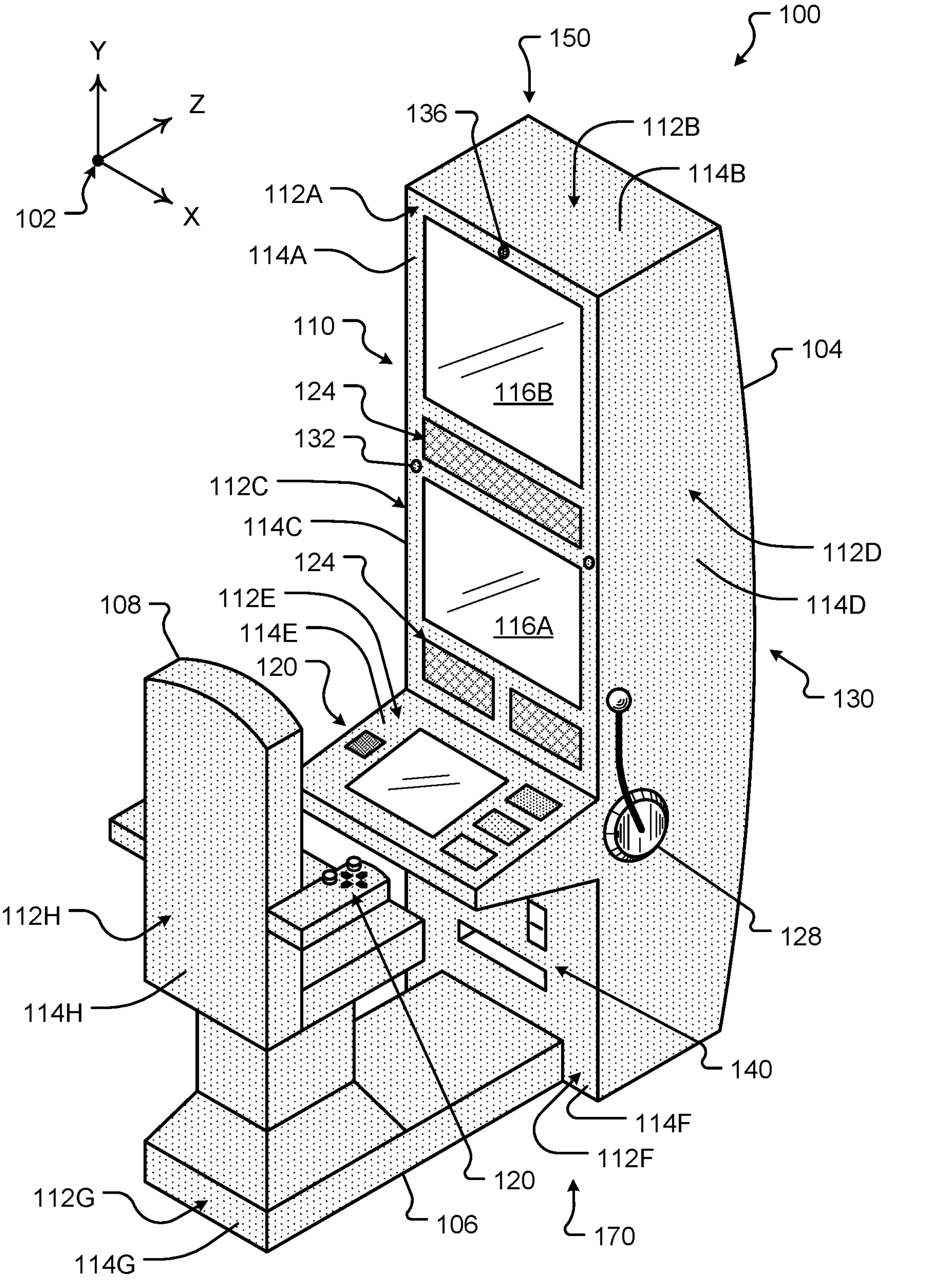
FIG. 1 is a perspective view of one example of an illustrative gaming device used in providing surface animations and color changes based on an occurrence of a trigger event.

Embodiments of the present disclosure will be described in connection with gaming devices (e.g., electronic gaming machines (EGMs), personal gaming machines, etc.) comprising dynamically changeable surface appearances. Today, when players play a gaming device (e.g., a slot machine, etc.) historically only the display, or physical reels animate in accordance to player activity or game activity. For example, when a player presses the spin button, the stepper reels of the gaming device, or display of the gaming device rendering virtual reels, may spin the physical or virtual reels, and display the game outcome to the player. Some gaming devices include lights or light rings that light up or otherwise provide an illumination animation. Many conventional gaming devices include a button panel attached, where the buttons may light up one or more colors (e.g., indicating if the button will allow player input or not, etc.) based upon the state of the gaming device. For example, the button panel may light up when the player has inserted credits onto the gaming device (e.g., via a bill, coins, a ticket voucher, a cashless transfer, etc.), and then the buttons may become disabled during play of a game, or may light up to celebrate the win of a slot game after the current game has completed. Additional physical enhancements have been made to gaming devices in order to further enhance the excitement of the player during play of the gaming device including, but in no way limited to, the following: additional monitors (e.g., digital glass or secondary monitor, topper monitor, etc.), digital button panels in various forms (e.g., organic light emitting diode (OLED) buttons, fully digital player button panel, etc.), associated physical peripherals (e.g., a wheel device, etc.), player chair with integrated sound, vibration, etc., three-dimensional (3D) displays, haptics for a four-dimensional (4D) physical player experience.

Some gaming devices contain a variety of hardware to present an entertaining gambling experience to players. One such example is a gaming device with a topper including additional lights, a candle, a bell, a liquid crystal display (LCD), light rings, etc. In this type of gaming device, major components that can drive the visual experience of a player may include: primary and secondary monitors, a topper monitor, a digital player panel, one or more light bars, and a candle. In these conventional gaming devices, additional surfaces of the gaming device cannot have their state controlled to further enhance the player experience. This includes any metallic and plastic surfaces of the player button panel deck, the area between the digital player panel and the primary monitor, the base of the cabinet or frame, the sides of the cabinet, and the back of the cabinet.

It is with respect to the above issues and other problems that the embodiments presented herein were contemplated. In some embodiments, the present disclosure describes enhancing the player experience and excitement generating capabilities of a gaming device (e.g., in a casino, etc.) by covering the surfaces of the gaming device (e.g., an EGM, etc.) in electronically programmable electronic-ink (E-Ink) surfaces or film and changing the state of those display surfaces via the processor and software of the gaming device or the slot machine interface board (SMIB) based upon activities of the player, the game, and/or the casino management system.

In some embodiments, one or more of the surfaces of an EGM can be covered in an interactive display technology, such as an E-Ink surface film, and the color and display state of the E-Ink surface film can change based upon the state of the EGM or SMIB (e.g., the device that controls the state of the surface display(s)). The various covered surfaces can be addressed in whole by the surface display controller (e.g., EGM or SMIB), or one or more sub-sections can be addressed and have its state changed uniquely in order to offer an entertaining display experience to players. State changes of the surface display technology can also occur immediately, or via an animated transition sequence. Display sequences may include changing the color of the surfaces and even allow smaller sections of the E-Ink surface film to be independently controlled. For example, an initial display sequence may involve changing the color of the EGM from white to black (or shades therebetween), while an advanced sequence may allow certain sections to change the color from white to black, while others animate a flame sequence to celebrate a large win for a player.

The state of the E-Ink surface film may be controlled by one or more of a state change triggering event and an event or animation type associated with the particular event. In some embodiments, data may be associated with a state change triggering event that may impact the animation type.

In one embodiment, a state change triggering event can be triggered when a player plays a game. The state change triggering event can occur when a player starts a game, hits a state change in the middle of a game, such as hitting a free spin bonus, or a certain award of the game during the game cycle. A state change triggering event can occur when a game ends. At the end of the game cycle, the state change triggering event can be tied to the game outcome a player obtains during the game cycle. For example, a state change triggering event may not be generated when a player does not win the game, but it could be changed when the player gets a winning game outcome. In another example, a state change triggering event could be further restricted or applied to only certain game outcomes, such as winning a jackpot, or the top award of the base game.

In some embodiments, display state change triggering events may be associated with a player first going to an EGM and inserting or otherwise depositing funds into the EGM (via a bill, physical coin, casino voucher, or via a cashless wagering account). The same or different display state change triggering event may be triggered when the player inserts their player tracking card to an EGM or SMIB to start a player session. A display state change triggering event may be associated with a player cashing out of an EGM, such as by pressing the cash-out button, or removing their player tracking card, etc.

In some embodiments, the display state change triggering events may be associated with the player starting or ending a player session at an EGM. Player sessions at EGMs can be started by a player inserting a player tracking card into a card reader of the EGM or SMIB, by engaging their mobile device with the EGM or SMIB, by entering a username or password, by scanning a physical item (e.g., an NFC tag, facial scan, retina scan, etc.). Similarly, a display state change triggering event may be associated with a player ending a player session at an EGM, such as by removing their player tracking card, ending their mobile session with the EGM, having an inactivity timer expire (otherwise known as a "walkaway detect timer" or an "abandoned card timer"), pressing the cash-out button, etc.

In one embodiment, when an EGM has been idle (e.g., with no player at the EGM, no credits on the credit meter, etc.), the EGM may go into what is called an "attract" mode, for instance, after a period of inactivity. The purpose of an attract mode is to advertise the EGM to players who are walking around the casino in an attempt to encourage them to play the game. When the EGM enters an attract mode, the EGM may generate a display state change triggering event (or series of events coupled to the states of the attract sequence) to further enhance the attract sequence display. A display state change triggering event may occur when cameras or sensors (e.g., visual, ultrasonic, etc.) of the EGM or SMIB detect a player in close proximity, such as walking by the EGM.

Certain display state change triggering events may be associated with error states of the EGM. For example, if the EGM is disabled, or in a tilt condition, a display state change triggering event may be triggered by the EGM or SMIB when the EGM enters the error or tilt condition. This triggering event and resulting change in appearance may aid the casino operator or regulator in finding the EGM on the casino floor that is in an error state.

In one embodiment, the display state of the E-Ink is triggered by the popularity of the EGM. For example, the most popular EGMs might display a certain color or pattern (e.g., fire red). Similarly EGMs that are "hot" might also display differently than those that are cold. A hot EGM might be one that is statistically due to hit a certain award, has awarded a certain amount over a certain time, has a certain progressive or bonus level attain (e.g. the progressive level is high), etc. In some embodiments, the display state could indicate one or more of the following: an operation state of the EGM (e.g., a disabled cabinet might not be lit or lit in a different manner than an operational EGM); a player account status (e.g., gold, silver, bronze levels, etc.) may include an achievement status, social category, donations made to a favorite charity, preferred sports teams, wagers made on sports, sports watched, animations could indicate wagers made, patterns, and/or the like; an SMIB state (including if a player session is active or not, or a player card or employee card is inserted or not into the card reader connected to the SMIB), which may directly control the surface animations (e.g., the SMIB may talk to the EGM, for instance, over a serial connection SAS protocol etc., and tell the EGM that there is a player at the EGM); a device state (e.g., such as a wheel device being tilted, a door being open, etc.); a game state such as hitting a bonus, award, progressive, certain symbols (e.g., reel stops); a system state such as being eligible for a bonus (e.g., a Lucky Coin bonus) or being awarded a system bonus (e.g., mystery progressives run by a system not the EGM where the player may be required to wager a certain amount per minute and may become ineligible after an expired time period, etc.); a monetary state such as having money on the credit meter; a regulatory state such as the EGM being titled, misconfigured or in an error state or displaying the relevant meters, signatures and packages installed; a pairing state, such as a mobile device being paired to an EGM (e.g., the EGM may display a color, pattern, and/or animation that matches the mobile device for security or to assist the player in finding the EGM with a mobile device); a play denomination amount, such as $1.00 denomination machines having a different color, pattern or animation than 5 cent machines, etc.; a tournament state, such as being enrolled in a tournament or being the winner of a tournament (e.g., a row or bank of machines may be setup for a tournament where players can play a special game and pay table on each machine, a countdown (e.g., "3-2-1 Go!") may be displayed by the surfaces and when the tournament starts, the surfaces of the machines may begin to pulsate faster, the winning machine may animate and others may not or may turn grey, white, etc.); a jackpot, attendant, or hand-pay state; a cabinet hardware, device, or software version, approval status, installed software, serial number, etc.; a state of a live, simulated or history video of sports wagering game such as events in the game, state of the game (e.g., score, inning, period, lime left, etc.), or wagers on the game being viewed; a matching theme to the current application or game (e.g., the EGM may display colors, pictures, and/or animations that match the current game theme); a progress state (e.g., the game might have a progress meter that goes from zero to 10 that indicates when a bonus will hit and the EGM may display colors, pictures, and/or animations that match or reinforce the zero to 10 progress meter; a change in a world event such as a news event, change in stock prices, change in cryptocurrency exchange rates, outcome of a sporting event, outcome of a news event, outcome of an awards event, jackpot at another casino, etc.; a configuration indication, such as limits, protocol configuration, supported languages, etc.; a representation of candle lighting associated with EGMs; an indication of how a player is wagering (e.g., what team, how much won, how much lost, etc.), for instance, if the player is wagering on the Dallas Cowboys the colors on the surfaces of the cabinet may be changed to indicate the colors of the Dallas Cowboys, etc.

In some embodiments, the same animation type could be associated with one or more state change triggering events, or the animation type can be custom or unique for a given state change triggering event. For example, if the player won a jackpot consisting of cherry symbols, the animations may animate a cherry (in a sophisticated environment), or may change color to red, and/or cycle between the base color of the EGM surface involved in the animation and a color representing the win.

The animations, or animation types, presented by the E-Ink surface film may incorporate data passed into the triggering event by the EGM, host system, sports wagering system, gaming bonus or progressive controller, or SMIB. For example, the display state change triggering event may be associated with a win of $100, and an animation type may then be triggered, with $100 passed into the animation type, resulting in the animation displaying information about the $100 win of the player.

In some embodiments, the animation type may change the color of one or more physical segments, or portions, of the EGM. In one embodiment, the animation type may animate a change from the current state to the desired state, so that the change seems gradual. The final state of the animation may be static, such as displaying a cherry. In another embodiment, the final state of the animation may cycle in some fashion, such as animating 3 cherry symbols of a slot payline hit. The animations provided by the E-Ink surface film may display colors, pictures, text, and/or videos. The animations may include pulsating, flashing, and/or other cyclic rendering presentations.

Although described in conjunction with gaming devices, such as EGMs, the E-Ink surface film may be attached to chairs, pedestals, bar tops, virtual tables, tabletop game structures, tables, and/or the like. Additionally or alternatively, the E-Ink surface film may be attached to one or more sides of a machine, device, or structure.

With reference initially to FIG. 1, details of a gaming device used in providing surface animations and color changes based on an occurrence of a trigger event will be described in accordance with at least some embodiments of the present disclosure. The gaming device 100 may comprise a cabinet, or frame, 104, a chair 108, and a bridge 106 connecting the cabinet 104 with the chair 108. In some embodiments, one or more electrical connections may run from components disposed in the cabinet 104 to the chair 108, and vice versa, via the bridge 106. In one embodiment, the bridge 106 may comprise a box structure or chamber comprising wireway, conduit, and/or other interconnections of the gaming device 100. In some embodiments, the bridge 106 may be formed from a portion of the cabinet 104 and/or the chair 108.

In some embodiments, reference may be made to dimensions, angles, directions, relative positions, and/or movements associated with one or more components of the gaming device 100 with respect to a coordinate system 102. The coordinate system 102, as shown in FIG. 1, includes three-dimensions comprising an X-axis, a Y-axis, and a Z-axis. Additionally or alternatively, the coordinate system 102 may be used to define planes (e.g., the XY-plane, the XZ-plane, and the YZ-plane) of the gaming device 100. These planes may be disposed orthogonal, or at 90 degrees, to one another. While the origin of the coordinate system 102 may be placed at any point on or near the gaming device 100 for the purposes of description, the axes of the coordinate system 102 are always disposed along the same directions from figure to figure. As shown in FIG. 1, the width of the gaming device 100 may be defined as a dimension along the X-axis (e.g., measured from the left-hand side 110 of the gaming device 100 to the right-hand side 130 of the gaming device 100), the height of the gaming device 100 may be defined as a dimension along the Y-axis (e.g., measured from the top 150 of the gaming device 100 to the bottom 170 of the gaming device 100), and the depth of the gaming device 100 may be defined as a dimension along the Z-axis (e.g., measured from the chair 108 to a rear of the cabinet 104, etc.). Other dimensions, angles, and relative positions of the one or more components of the gaming device 100 may be as described herein.

The cabinet, or frame, 104 of the gaming device 100 may comprise, or define, a plurality of surfaces 112. As shown in FIG. 1, the surfaces 112 are represented by the surfaces 112A-112H. These surfaces 112 may include, but are in no way limited to, a first surface 112A, a second surface 112B, a third surface 112C, a fourth surface 112D, a fifth surface 112E, a sixth surface 112F, a seventh surface 112G, and a seventh surface 112G. The first surface 112A may correspond to the front surface of the gaming device 100. The second surface 112B may correspond to the top surface of the gaming device 100. The third surface 112C and fourth surface 112D may correspond to the side surfaces of the gaming device 100. The fifth surface 112E may correspond to an angled playing surface of the gaming device 100. The sixth surface 112F may correspond to a lower front surface of the gaming device 100. The seventh surface 112G may correspond to a lower seat portion, or pedestal, surface of the chair 108 of the gaming device 100. This seventh surface 112G may cover a portion of the bridge 106 of the gaming device 100. The eighth surface 112H may correspond to a rear seatback portion of the chair 108 of the gaming device 100.

In some embodiments, the E-Ink film 114 may comprise one or more E-Ink film portions 114A-114H. The first E-Ink film portion 114A may be attached to the first surface 112A of the gaming device 100. The second E-Ink film portion 114B may be attached to the second surface 112B of the gaming device 100. The third E-Ink film portion 114C may be attached to the third surface 112C of the gaming device 100. The fourth E-Ink film portion 114D may be attached to the fourth surface 112D of the gaming device 100. The fifth E-Ink film portion 114E may be attached to the fifth surface 112E of the gaming device 100. The sixth E-Ink film portion 114F may be attached to the sixth surface 112F of the gaming device 100. The seventh E-Ink film portion 114G may be attached to the seventh surface 112G of the gaming device 100. The eighth E-Ink film portion 114H may be attached to the eighth surface 112H of the gaming device 100. Together, one or more of the E-Ink film portions 114A-114H may form the E-Ink film 114 of the gaming device 100. The E-Ink film 114 may be attached to the cabinet 104 (e.g., the surfaces 112 of the cabinet, or frame, 104) via an adhesive layer that is disposed between the E-Ink film 114 and the surfaces 112 of the gaming device 100. In some embodiments, the E-Ink film 114 may bend, or span, across two or more surfaces 112 of the gaming device 100. The E-Ink film 114 may be made from separate portions that can be controlled together or independently. In some embodiments, the E-Ink film 114 may be made from a single sheet of film that is attached to multiple surfaces 112 of the gaming device 100. As illustrated in FIG. 1, the E-Ink film portions 114A-114H are shown in a shaded appearance.

A gaming device 100 may correspond to a type of device that enables player interaction in connection with playing games (e.g., games of chance, arcade games, games of skill, etc.) and providing surface animations and color changes based on an occurrence of a trigger event. For instance, the gaming device 100 may correspond to a type of device that enables a player to interact via a display device (e.g., display screens 116A, 116B, etc.), user interface devices 120, lever (s) 128, and/or other devices and hardware. A gaming device 100 may include any type of known gaming device such as a slot machine, a table game, an electronic table game (e.g., video poker), a skill-based game, an arcade game, etc. The gaming device 100 can be in the form of an EGM, virtual gaming machine, video game gambling machine, etc.

In some embodiments, the gaming device 100 may comprise one or more display screens 116A, 116B. The display screens 116A, 116B may correspond to an LCD, light emitting diode (LED) display, OLED display, active-matrix OLED display, touchscreen display, and/or any other display device capable of rendering images to a screen portion of the display screens 116A, 116B. Although shown in the form of a substantially rectangular shape, it should be appreciated that the display may be of any shape including, but in no way limited to, a square, circle, ovoid, triangle, polygon, etc., and/or combinations thereof. In some embodiments, the display screens 116A, 116B may comprise a number of pixels that substantially fill an area of the display screens 116A, 116B. Among other things, the display screens 116A, 116B may render game information to a player of the gaming device 100.

The gaming device 100 may comprise one or more user interface devices 120 disposed on, or in, a portion of the cabinet 104 (e.g., touchscreens, buttons, keyboards, etc.), the chair 108 (e.g., joysticks, buttons, switches, directional pads, etc.), and/or the bridge 106 (e.g., foot pedals, etc.). A player of the gaming device 100 may interact with the gaming device 100 via one or more of the user interface devices 120 as described herein.

In some embodiments, the gaming device 100 may include one or more speakers 124 disposed in, or on, a front of the cabinet 104 (e.g., facing the chair 108) and/or in a portion of the chair 108. The speakers 124 may provide an audio output of the gaming device 100 in monaural form and/or stereophonic sound. In one embodiment, the speakers 124 may produce an audio output to a player sitting in the chair 108 of the gaming device 100. The audio output may be focused on the player sitting in the chair 108 such that no other position around the gaming device 100 can detect the audio output produced by the speakers 124. This focused audio output may be referred to herein as spatial, or directional, audio output. The speakers 124 may comprise at least one electroacoustic transducer, tactile sound transducer, electrostatic speaker, dynamic loudspeaker, moving-coil loudspeaker, subwoofer, or other speaker.

Another user interface device may comprise one or more lever(s) 128. The lever(s) 128 may correspond to a pivotable lever associated with a "one-armed bandit" slot machine. In one embodiment, a player may pull the lever 128, causing the lever 128 to rotate about the X-axis of the coordinate system 102, and providing a gaming input to the gaming device 100. In some embodiments, the gaming input may direct the gaming device 100 to initiate a game, spin reels associated with a game, and/or the like.

In some embodiments, the gaming device 100 may comprise one or more image sensors 132 disposed on, or about, the cabinet 104. The image sensors 132 may include, but are in no way limited to, a light source (e.g., infrared (IR) light source, etc.), camera, photosensor, processor, and/or the like. The image sensors 132 may detect a player in proximity to the gaming device 100. The image sensors 132 may determine gestures made in proximity to the gaming device 100 by, for example, emitting IR light from the front of the cabinet 104 in a direction toward the chair 108. The IR light may illuminate an object (e.g., a player, etc.) disposed between the chair 108 and the cabinet 104. A photosensor of the image sensors 132 may measure, via a number of pixels disposed thereon, a distance the IR light has traveled from the IR light source to the object defining a depth of features associated the object (e.g., hands, head, body parts, etc. of a player). This spatial information of the player may be determined in real time, via the processor, and mapped to gestures stored for player actions in a memory of the gaming device 100. Among other things, the image sensors 132 alone, or in combination with other user interface hardware of the gaming device 100, may determine and interpret gestures, movements, and/or other information associated with a player at the gaming device 100.

The gaming device 100 may include at least one camera 136, or image capture device, that is configured to capture still and/or video images in proximity to the gaming device 100. The camera 136 may include, or be associated, with additional devices, such as light sources, flashes, IR emitters, etc., to provide a clear image capture environment in proximity to the gaming device 100. The camera 136 may comprise multiple cameras configured to record stereo images of objects, such as players, in proximity to the gaming device 100. As provided herein the camera 136 may be controlled by the processor 204 in conjunction with signals from the game instruction set 220, the hardware-unlock instruction set 228, and/or other instruction sets in the memory 208 (e.g., shown and described in conjunction with FIG. 2). The camera 136 may be used in conjunction with the image sensors 132 and/or any other device of the gaming device 100 to identify a player, determine movements, detect gestures, and/or interpret other player input for the gaming device 100.

In some embodiments, the gaming device 100 may comprise one or more payout devices 140. The payout devices 140 may include a physical coin payout mechanism that releases or distributes a predetermined number of coins from a secure area of the cabinet 104 into a coin tray, or other receptacle, disposed outside of the secure area of the cabinet 104 when a player wins an amount of money via the gaming device 100. The player may collect the coins by accessing the coin tray (e.g., disposed on the front of the cabinet 104). The physical coin payout mechanism may operate and issue cash, coins, tokens, or chips based on an amount indicated within the credit meter of the player. In some embodiments, the physical coin payout mechanism may include counting hardware configured to count and distribute an appropriate amount of coins, or tokens, based on a player's winnings or available credit within the credit meter (e.g., credit meter 224 described in conjunction with FIG. 2). In one embodiment, the payout devices 140 may include a ticket issuance device that is configured to print or provide physical tickets/vouchers to players. In some embodiments, the ticket issuance device may be configured to issue a ticket/voucher consistent with an amount of credit available to a player, possibly as indicated within a credit meter for the player.

Figure 2:
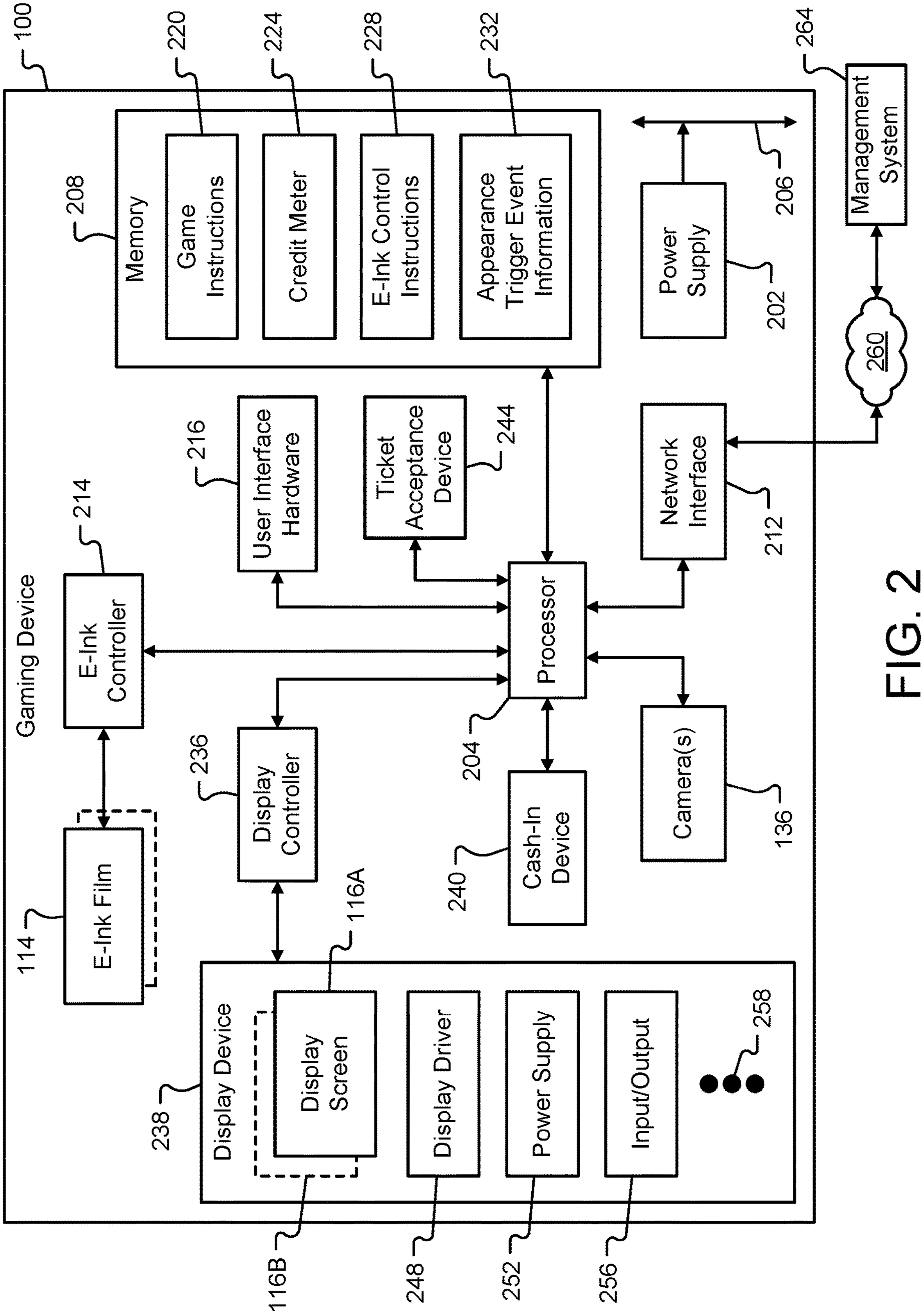
FIG. 2 is a block diagram depicting components of a gaming device that selectively provides surface animations and color changes based on an occurrence of a trigger event.

With reference now to FIG. 2, additional details of a gaming device 100 will be described in accordance with at least some embodiments of the present disclosure. The gaming device 100 is depicted to include E-Ink film 114, a power supply 202, a processor 204, a memory 208, a network interface 212, an E-Ink controller, user interface hardware 216, a display controller 236, a display device 238, a cash-in device 240, a ticket acceptance device 244, and one or more cameras 136. In some embodiments, the gaming device 100 may receive instructions from and/or communicate with a management system server 264 (e.g., a remote management server, casino management server, etc.) across a communication network 260.

The power supply 202 may provide electric power to one or more components of the gaming device 100. In some embodiments, the power supply 202 may include a transformer and/or other electronics that prevent overloading, condition power signals, and/or provide backup power to the components of the gaming device 100. For instance, the power supply 202 may provide power (e.g., voltage, etc.) to the E-Ink controller 214 to change an appearance state of the E-Ink film 114. In some embodiments, once the E-Ink film 114 is provided a voltage to change an appearance state, the E-Ink film 114 may not require further voltage to maintain the appearance state. The power supply 202 may be connected to a power bus 206 of the gaming device 100. The power bus may distribute power to the one or more components of the gaming device 100.

In some embodiments, the processor 204 may correspond to one or many computer processing devices. For instance, the processor 204 may be provided as silicon, as a Field Programmable Gate Array (FPGA), an Application-Specific Integrated Circuit (ASIC), any other type of Integrated Circuit (IC) chip, a collection of IC chips, or the like. As a more specific example, the processor 204 may be provided as a microprocessor, Central Processing Unit (CPU), or plurality of microprocessors that are configured to execute the instructions sets stored in memory 208. Upon executing the instruction sets stored in memory 208, the processor 204 enables various player authentication, game management functions, and surface appearance changes of the gaming device 100.

The memory 208 may include any type of computer memory device or collection of computer memory devices. Non-limiting examples of memory 208 include Random Access Memory (RAM), Read Only Memory (ROM), flash memory, Electronically-Erasable Programmable ROM (EEPROM), Dynamic RAM (DRAM), etc. The memory 208 may be configured to store the instruction sets depicted in addition to temporarily storing data for the processor 204 to execute various types of routines or functions. Although not depicted, the memory 208 may include instructions that enable the processor 204 to store data into a player profile database and/or retrieve information from a player profile database. The player profile database or data stored therein may be stored internal to the gaming device 100 (e.g., within the memory 208 of the gaming device 100 rather than in a separate database) or in a separate server (e.g., the management system server 264).

The memory 208 may store various data and instruction sets that allow the gaming device 100 to manage the appearance of the E-Ink film 114 and surfaces 112 of the gaming device, render color, images, data, and/or animations to the E-Ink film 114, and change the appearance of the E-Ink film 114 based on trigger events. Examples of instruction sets and information that may be stored in the memory 208 include player information, a game instruction set 220, a credit meter 224, an E-Ink control instruction set 228, appearance trigger event information, and/or other instruction sets.

In some embodiments, the game instructions 220, when executed by the processor 204, may enable the gaming device 100 to facilitate one or more games of chance or skill and produce interactions between the player and the game of chance or skill. In some embodiments, the game instructions 220 may include subroutines that present one or more graphics to the player via the display device 238 and/or one or more devices of the user interface hardware 216, subroutines that calculate whether a particular game wager has resulted in a win or loss during the game of chance or skill, subroutines for determining payouts for the player in the event of a win, subroutines for exchanging communications with a connected server, subroutines for enabling the player to engage in a game using their mobile device, and any other subroutine or set of instructions that facilitate gameplay at or in association with the gaming device 100.

The credit meter 224 may correspond to a data structure within the gaming device 100 that facilitates a tracking of activity at the gaming device 100. In some embodiments, the credit meter 224 may be used to store or log information related to various player activities and events that occur at the gaming device 100. The types of information that may be maintained in the credit meter 224 include, without limitation, player information, available credit information, wager amount information, and other types of information that may or may not need to be recorded for purposes of accounting for wagers placed at the gaming device 100 and payouts made for a player during a game of chance or skill played at the gaming device 100. In some embodiments, the credit meter 224 may be configured to track coin-in activity, coin-out activity, coin-drop activity, jackpot paid activity, bonus paid activity, credits applied activity, external bonus payout activity, ticket/voucher in activity, ticket/voucher out activity, timing of events that occur at the gaming device 100, and the like. In some embodiments, certain portions of the credit meter 224 may be updated in response to outcomes of a game of chance or skill played at the gaming device 100. In some embodiments, the credit meter 224 may be updated depending upon whether the gaming device 100 is issuing a ticket/voucher, being used as a point of redemption for a ticket/voucher, and/or any other activity associated with a ticket/voucher. Some or all of the data within the credit meter 224 may be reported to a server separate from the gaming device 100, for example, if such data applies to a centrally-managed game and/or a status of a ticket/voucher. As an example, the number, value, and timing of wagers placed by a particular player and payouts on such wagers may be reported to a casino server that is separate and apart from the gaming device 100.

The E-Ink control instruction set 228, when executed by the processor 204, may enable the gaming device 100 to render an appearance of the gaming device via the E-Ink film 114 attached to one or more surfaces 112 of the gaming device 100. In some embodiments, the E-Ink control instruction set 228 may determine, based on a trigger event occurring, whether to alter an appearance of the gaming device 100 by controlling a power provided to the E-Ink film 114. The E-Ink control instruction set 228 may include rules for rendering a specific appearance (e.g., image, text, animation, etc.) to the E-Ink film 114. The E-Ink control instruction set 228 may dynamically alter various display presentations of the surfaces 112 of the gaming device 100 that are outside of, or surrounding, areas of the display screens 116A, 116B. In some embodiments, the E-Ink instruction set 228 may cause the E-Ink film 114 to render one or more alerts, alarms, winning graphics, flashing graphics, pulsating graphics, losing graphics, messages, and/or the like, to one or more the surfaces 112 of the gaming device 100.

The appearance trigger event information 232 may comprise information that defines trigger events, appearance states, and/or relationships between trigger events and appearance states. In some embodiments, the appearance trigger event information 232 may comprise information used by the E-Ink control instruction set 228 in controlling an appearance presented to, or rendered by, the E-Ink film 114. Examples of information stored in the appearance trigger event information 232 are described in greater detail in conjunction with FIG. 3.

The network interface 212 provides the gaming device 100 with the ability to send and receive communication packets or the like over the communication network. The network interface 212 may be provided as a network interface card (NIC), an SMIB, a network port, a modem, drivers for the same, and the like. Communications between the components of the gaming device 100 and other devices connected to the communication network 260 may all flow through the network interface 212. In some embodiments, examples of a suitable network interface 212 include, without limitation, an Ethernet port, a USB port, an RS-232 port, an RS-485 port, a NIC, an antenna, a driver circuit, a modulator/demodulator, etc. The network interface 212 may include one or multiple different network interfaces depending upon whether the gaming device 100 is connecting to a single communication network or multiple different types of communication networks. For instance, the gaming device 100 may be provided with both a wired network interface and a wireless network interface without departing from the scope of the present disclosure. In some embodiments, the network interface 212 may include different communications ports that interconnect with various input/output lines.

The E-Ink controller 214 may correspond to any processor, microprocessor, or controller that is configured to control an operation of the E-Ink film 114. The E-Ink controller 214 may be a processor that is the same as, or similar to, the processor 204 described above. The operation of the E-Ink film 114 may include, but is in no way limited to, the control of voltage presented to one or more E-Ink film portions 114A-114H of the E-Ink film 114, images rendered by the E-Ink film 114, colors rendered by the E-Ink film 114, animations rendered by the E-Ink film 114, other functions of the E-Ink film 114, and/or combinations thereof. The E-Ink controller 214 may activate or deactivate E-Ink film portions 114A-114H, or further divided portions and/or sections, of the E-Ink film 114.

The user interface hardware 216 may correspond to any type of input and/or output device, or combination thereof, that enables the player to interact with the gaming device 100. As can be appreciated, the nature of the user interface hardware 216 may depend upon the nature of the gaming device 100. For instance, if the gaming device 100 includes a slot machine game, then the user interface hardware 216 may include one or more reels, or virtually rendered reels, with symbols provided thereon, one or more lights or LED displays, one or more depressible buttons, a lever 128 or "one armed bandit handle," a speaker 124, or combinations thereof. In some embodiments, the user interface hardware 216 may include one or more touch-sensitive displays, LED/LCD display screens, buttons, switches, etc. as described herein.

The gaming device 100 may include one or more display devices 238 configured to render information, games, settings windows, hardware information, interactive elements, and/or other visual output to one or more display screens 116A, 116B. The gaming device 100 may include one or more display controllers 236 configured to control an operation of the display device 238. This operation may include the control of input (e.g., player input via one or more device of the user interface hardware 216, command input via the instruction sets in memory 208, combinations thereof, etc.), output (e.g., display, rendered images, visual game behavior, etc.) and/or other functions of the display device 238.

The display device 238 may comprise one or more display screens 116A, 116B that are configured to selectively activate pixels and/or display elements to render one or more games, windows, indicators, interactive elements, icons, characters, lights, images, etc. As provided above, examples of the display screens 116A, 116B may include, but are in no way limited to, an LCD, an LED display, an ELD, an OLED display, and/or some other two-dimensional and/or three-dimensional display. In some embodiments, the one or more display screens 116A, 116B may be separated into a first display screen 116A (e.g., a main display) and a second display screen 116B (e.g., a secondary display). In a gaming device 100 context, the main display may correspond to a display arranged in a first viewing position of a player and the secondary display may correspond to a display arranged in a second (e.g., higher) viewing position of the player, as illustrated in FIG. 1. It is an aspect of the present disclosure that the gaming device 100 may include any number of display screens 116A-116B in any arrangement or orientation (e.g., stacked, side-by-side, staggered, overlapped, angled, and/or combinations thereof). In some embodiments, the display device 238 may be configured to render information in one or more discrete areas (e.g., windows, portions, zones, backgrounds, etc.) of the display screens 116A, 116B or superimposed in an area of the one or more display screens 116A, 116B.

The display device 238 may include a display driver 248, a power supply 252, an input/output 256, and/or other components 258 configured to enable operation of the display device 238. The display driver 248 may receive commands and/or other data provided by the processor 204 and one or more of the instruction sets in memory 208. In response to receiving the commands, the display driver 248 may be configured to generate the driving signals necessary to render the appropriate images to the display screens 116A, 116B. The power supply 252 may provide electric power to the components of the display device 238. In some embodiments, the power supply 252 may include a transformer and/or other electronics that prevent overloading, condition power signals, and/or provide backup power to the display device 238. The input/output 256 may correspond to one or more connections for receiving or exchanging information and/or video from components of the gaming device 100. The input/output 256 may include an interconnection to the network interface 212. For example, the input/output 256 may include a high-definition multimedia interface (HDMI) input, Ethernet, composite video, component video, H.264, or other video connection.

The cash-in device 240 may include a bill acceptor, a coin acceptor, a chip acceptor or reader, or the like. In some embodiments, the cash-in device may also include credit card reader hardware and/or software. In one embodiment, the cash-in device 240 may be a part of the payout devices 140.

Because the gaming device 100 may be used for the acceptance and issuance of tickets/vouchers, the gaming device 100 may be provided with appropriate hardware to facilitate such acceptance and issuance. Specifically, the gaming device 100 may be provided with a ticket acceptance device 244 that is configured to accept or scan physically-printed tickets/vouchers and extract appropriate information therefrom. In some embodiments, the ticket acceptance device 244 may include one or more machine vision devices (e.g., a camera, IR scanner, optical scanner, barcode scanner, etc.), a physical ticket acceptor, a shredder, etc. The ticket acceptance device 244 may be configured to accept physical tickets and/or electronic tickets without departing from the scope of the present disclosure. An electronic ticket/voucher may be accepted by scanning a one-dimensional barcode, two-dimensional barcode, or other type of barcode or quick response (QR) code displayed by a player's mobile device, for example. In one embodiment, an impersonal player ID may be present on the electronic ticket/voucher as part of the barcode, QR code, or other visible information on the electronic ticket/voucher.

In accordance with at least some embodiments of the present disclosure, the communication network 260 may comprise any type of known communication medium or collection of communication media and may use any type of protocols to transport messages between endpoints. The communication network 260 may include wired and/or wireless communication technologies. The Internet is an example of the communication network 260 that constitutes an Internet Protocol ("IP") network consisting of many computers, computing networks, and other communication devices located all over the world, which are connected through many telephone systems and other means. Other examples of the communication network 260 include, without limitation, a standard Plain Old Telephone System ("POTS"), an Integrated Services Digital Network ("ISDN"), the Public Switched Telephone Network ("PSTN"), a Local Area Network ("LAN"), a Wide Area Network ("WAN"), a VoIP network, a cellular network, and any other type of packet-switched or circuit-switched network known in the art. In addition, it can be appreciated that the communication network 260 need not be limited to any one network type, and instead may be comprised of a number of different networks and/or network types. The communication network 260 may comprise a number of different communication media such as coaxial cable, copper cable/wire, fiber-optic cable, antennas for transmitting/receiving wireless messages, optical/infrared, and combinations thereof.

Figure 3:
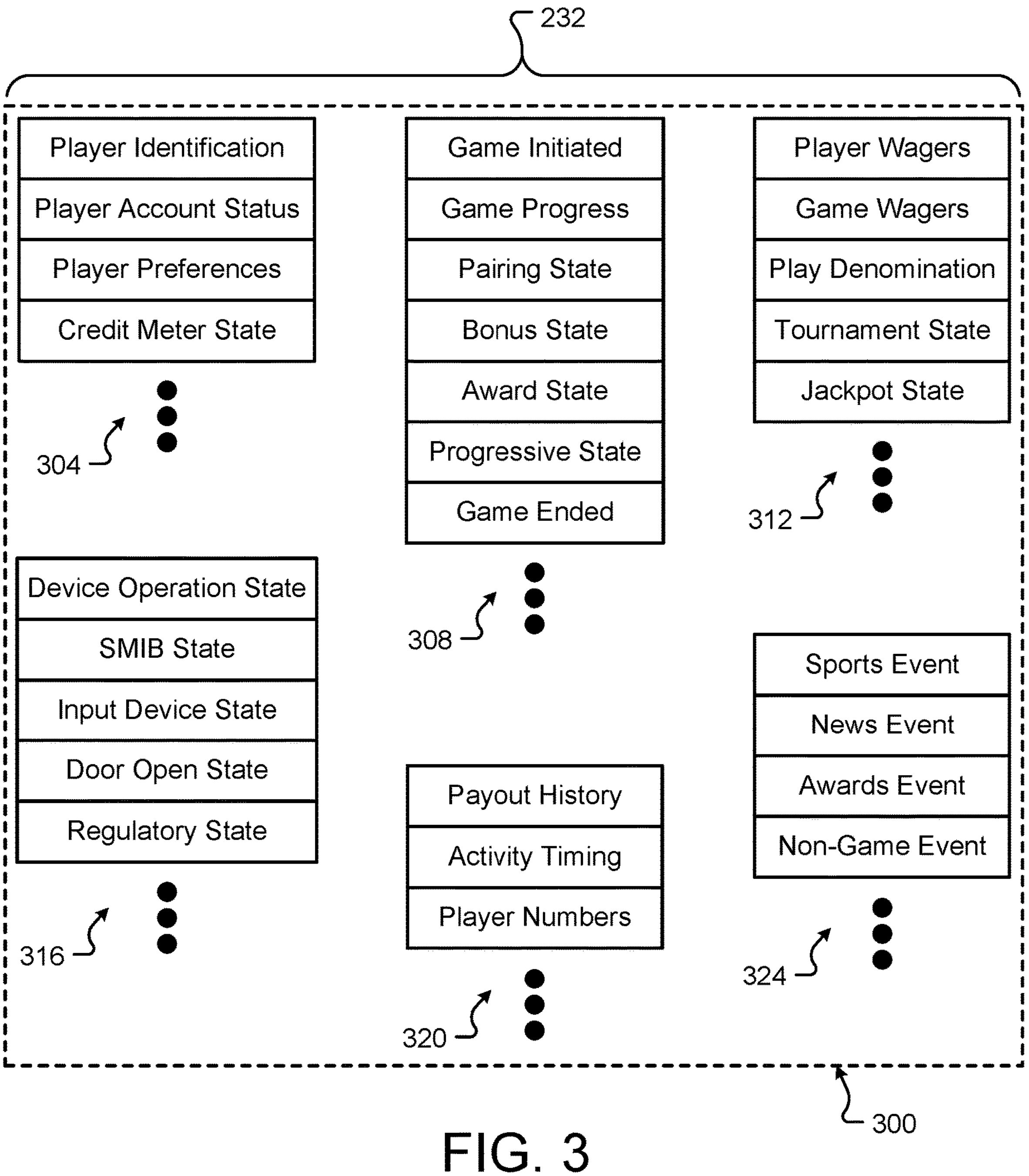
FIG. 3 is a block diagram depicting an appearance trigger event information data structure stored in a memory storage device for determining surface appearances for a gaming device based on trigger events.

FIG. 3 is a block diagram depicting an appearance trigger event information data structure 300 in accordance with embodiments of the present disclosure. The appearance trigger event information data structure 300 may be used by, for example, the E-Ink control instruction set 228 to determine surface appearances for the gaming device 100. The surface appearances for the gaming device 100 may be based on one or more trigger events (e.g., identifications, statuses, events, states, and/or timing, etc.) that is stored in the appearance trigger event information data structure 300. Additionally or alternatively, the information in the appearance trigger event information data structure 300 may be used by the processor 204 and/or the E-Ink controller 214 in performing the methods described herein and in conjunction with FIG. 9.

The appearance trigger event information data structure 300 may be stored in the appearance trigger event information 232 and/or other memory storage device (e.g., a memory storage device of the management system server 264, etc.). As a non-limiting example, the appearance trigger event information data structure 300 may be used to store player information, game states, device states, and other events that may serve as triggers for appearance changes. Even more specifically, the appearance trigger event information data structure 300 may include a plurality of data fields that include, for instance, a player information field 304, a game state information field 308, a wager information field 312, a device state information field 316, an activity data field 320, and a world event information field 324.

The player information field 304 may be used to store any type of information that identifies a player or a group of players. In some embodiments, the player information field 304 may store one or more of username information for a player, password information for a player account, player account status information, player preferences, credit meter state for a player, accommodations associated with the player, and any other type of customer service management data that may be stored with respect to a player. The player information field 304 may store biometric or feature identification information about a player. In one embodiment, the cameras 136 may record features of a player and compare the features to the identification information stored in the player information field 304 to positively identify one player from another. Additionally or alternatively, the player information field 304 may store the player's favorite games, favorite teams, and/or other preferences associated with the player. In some embodiments, the player information field 304 may include a player type associated with the player. The player type may define a playing behavior of the player over time. For instance, the player type may define the player as a "high roller" when the player historically places large bets, or wagers, on game outcomes, places a number of bets totaling a predetermined amount in a given period of time, etc. Additionally or alternatively, the player type may define the player as a "frequent player" based on a number of games played per minute, per day, per week, etc. reaching a predetermined games-played rate. In some embodiments, the player type may define the player as a "variety player" based on the player playing a predetermined number of different types of games over time. In one embodiment, the player may be defined by a combination of the information stored in the player information field 304. By way of example, in the event that the player preferences define that a player's favorite team is the Colorado Avalanche, the E-Ink control instruction set 228 may determine to cause the E-Ink controller 214 to alter an appearance of the gaming device 100 to include Colorado Avalanche logos, colors, animations, etc.

The game state information field 308 may be used to store information associated with a game, bonus, award, and/or gameplay at a gaming device 100. The game state information field 308 may include information that identifies when a game is initiated at a gaming device 100 (e.g., via a player, etc.), a game progress associated with the game (e.g., a level reached, an achievement unlocked, winning play, etc.), a pairing state with a mobile device, a bonus state, an award state, a state of a progressive associated with a player and/or a gaming device 100, and/or when a game is ended (e.g., quitting by a player, ending after winning a game, ending after a game is lost, etc.), and/or the like. This information, for example, may be used by the E-Ink control instruction set 228 determining when a player has reached a high level and cause the E-Ink controller 214 to alter the appearance of the E-Ink film 114 to render celebratory images, pulsating portions, and/or other graphics.

The wager information field 312 may be used to store data about a player's available credit with a casino, wagers made when playing particular games in a casino, and/or other wagering information for the player. In one embodiment, the wager information field 312 may store an electronic record of available credit in the player's account and whether any restrictions are associated with such credit. The wager information field 312 may further store information describing a player's available credit over time, cash-out events for the player, winning events for the player, and the like. In some embodiments, the wager information field 312 may store information describing amounts won and/or lost from wagering on games, amounts won and/or lost from playing a game of the gaming device 100, and/or other betting information associated with the player. Additionally or alternatively, the wager information field 312 may include information about tournament or jackpot states associated with a particular player and/or gaming device 100. For example, the E-Ink control instruction set 228 may refer to the wager information field 312 to determine that a gaming device 100, and/or player, has won a tournament. In this example, the E-Ink control instruction set 228 may then cause the E-Ink controller 214 to change an appearance state of the E-Ink film 114 to highlight the win (e.g., by causing a "raining coins" animation, or the like, to render to the surfaces 112 of the gaming device 100. In some embodiments, the E-Ink film 114 may include rendered text associated with the win (e.g., "Winner!").

The device state information field 316 may be used to store data about a state of the gaming device 100 and/or any component associated with the gaming device 100. This data may include information about an operational state of the gaming device 100 (e.g., operational, out-of-order, error, tampered with, etc.), a state of the SMIB, a state of an input device (e.g., working, malfunctioning, disabled, etc.), a door open state, and/or a regulatory state, or more. In some embodiments, the device state information field 316 may define whether a gaming device 100 is in an error state and needs service. For instance, when a component of the gaming device 100 fails, the E-Ink control instruction set 228 may refer to the data in the device state information field 316 to determine that the gaming device 100 needs service. In this example, the E-Ink control instruction set 228 may cause the E-Ink controller 214 to alter an appearance of the E-Ink film 114 that messages this service state. In one embodiment, the E-Ink film 114 may render an alert, a warning, and/or an error symbol on one or more of the surfaces 112 of the gaming device 100.

The activity data field 320 may store data related to an activity associated with a gaming device 100. This data may include, but is in no way limited to, payout history, activity and timing, and/or a number of different players who have played the gaming device 100 (e.g., defining a popularity of the gaming device 100). The activity data field 320 may be referred to by the E-Ink control instruction set 228 in determining whether a gaming device 100 is in an active or an idle state. By way of example, the time since last play may be stored as activity timing for the gaming device 100. Continuing this example, when the E-Ink control instruction set 228 determines that the gaming device 100 has been idle for a predetermined amount of time, the E-Ink control instruction set 228 may cause the E-Ink controller 214 to change an appearance of the E-Ink film 114. As described above, when the activity is idle, the E-Ink film 114 may render "attract" graphics and/or animations to encourage players to play a game on the gaming device 100. These attract graphics may include pulsating images, animated display elements, or other graphics that are rendered to the surfaces 112 of the gaming device 100 via the E-Ink film 114.

The world event information field 324 may store data related to any event that is associated with an event outside of the gaming device 100. Examples of this data may include, but are in no way limited to, an outcome of a sports event, a news event, an awards event outcome, and/or any non-game event (e.g., weather conditions, market rates, stock market state, exchange rate changes, etc.). In one embodiment, when a major news event (e.g., breaking news, etc.) occurs, the E-Ink control instruction set 228 may refer to the world event information field 324 to determine an appropriate appearance for the E-Ink film 114. In some embodiments, this appearance may include a "breaking news" graphic or animation rendered to the E-Ink film 114 along with information about the news event. This information may be presented in rolling text along one or more of the surfaces 112 of the gaming device 100.

Figure 4A:
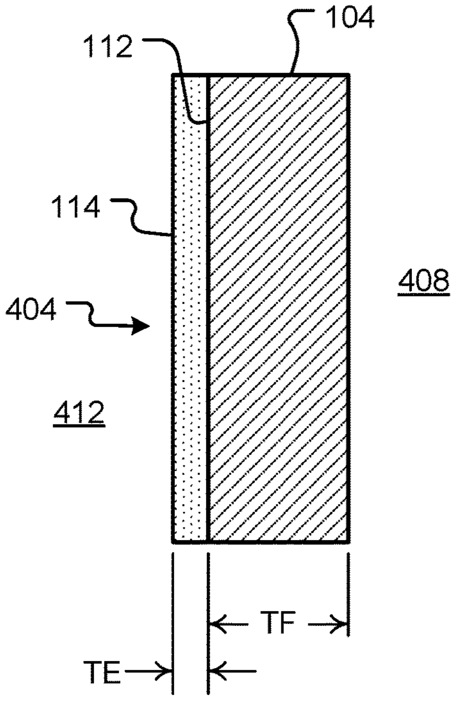
FIG. 4A is a schematic cross-sectional view of a first portion of an electronic-ink film attached to a frame of a gaming device.
Figure 4B:
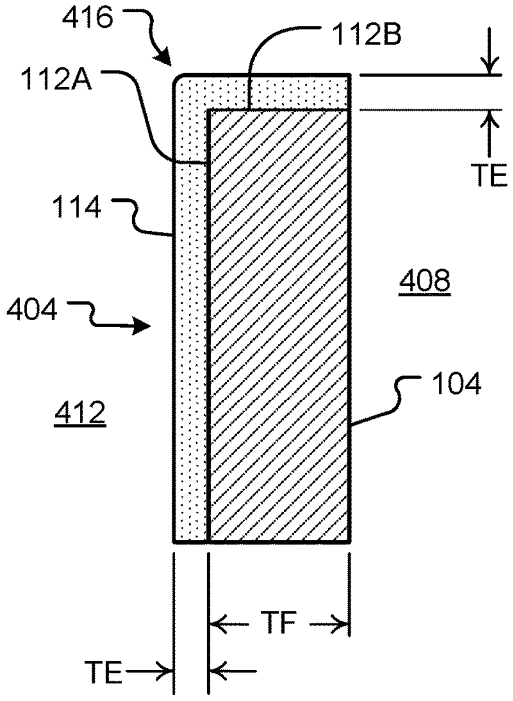
FIG. 4B is a schematic cross-sectional view of a second portion of an electronic-ink film attached to a frame of a gaming device.
Figure 4C:
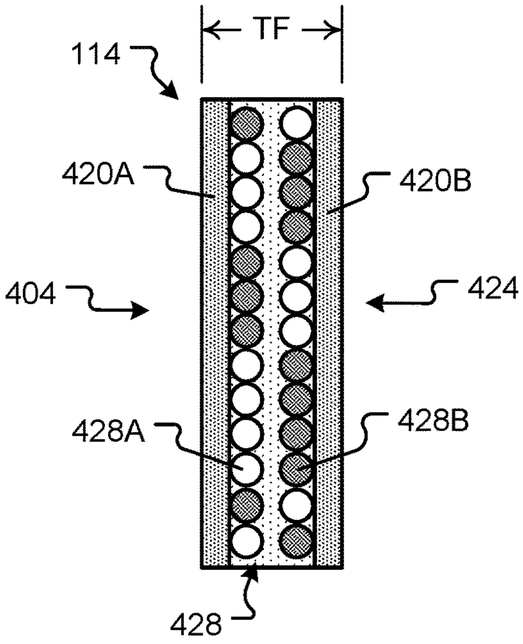
FIG. 4C is a schematic cross-sectional view of the arrangement of the electronic-ink film that is attached to the frame of the gaming device.

FIGS. 4A-4C show various schematic cross-sectional views of portions of the E-Ink film 114 in accordance with embodiments of the present disclosure. FIGS. 4A and 4B show schematic cross-sectional views of portions of the E-Ink film 114 attached to a cabinet, or frame, 104 of a gaming device 100. More specifically, the portions of the E-Ink film 114 show in FIGS. 4A and 4B are shown attached to at least one surface 112 (e.g., first surface 112A, second surface 112B, etc.) of the cabinet 104. The E-Ink film 114 may be attached to the cabinet 104 via an adhesive that is disposed between the E-Ink film 114 and the cabinet 104. In some embodiments, the E-Ink film 114 may be attached to the cabinet 104 such that an E-Ink viewing side 404 is arranged facing an exterior space 412 of the gaming device 100 and the cabinet 104 is disposed between the E-Ink film 114 and an interior space 408 of the gaming device 100. The E-Ink film 114 may have an E-Ink film thickness, TE, and the cabinet 104 may include a portion having a frame thickness, TF.

As illustrated in FIG. 4B, the E-Ink film 114 is shown bent, or spanning, across two adjacent surfaces 112 (e.g., first surface 112A and second surface 112B) of the cabinet 104. This arrangement of the E-Ink film 114 may allow graphics to be continually displayed across edges of the cabinet 104 of the gaming device 100. For instance, graphics may be rendered across a corner 416 bend of the E-Ink film 114 extending from the first surface 112A to the second surface 112B.

FIG. 4C is a schematic cross-sectional view of the arrangement of the E-Ink film 114 in accordance with embodiments of the present disclosure. The E-Ink film 114 may comprise a plurality of E-ink particles 428 that are sandwiched between layers of a film material 420A, 420B of the E-Ink film 114. In particular, the E-Ink film 114 may comprise a first film material layer 420A and a second film material layer 420B with a space disposed therebetween. In one embodiment, the E-Ink particles 428 may be suspended in a fluid (e.g., oil, etc.) that allows the E-Ink particles 428 to move between the first film material layer 420A and the second film material layer 420B. A plurality of E-Ink particles 428 may be disposed in the space between the first film material layer 420A and the second film material layer 420B. The E-Ink particles 428 may comprise first E-Ink particles 428A (e.g., shown as white) and second E-Ink particles 428B (e.g., shown as a contrasting color to white). As portions of the E-Ink film 114 are charged (e.g., via an applied voltage thereto, etc.) one or more of the E-Ink particles 428 may move closer to the first film material layer 420A or closer to the second film material layer 420B. The E-Ink particles 428 that are moved, or disposed, closer to the first film material layer 420A than the second film material layer 420B may be visible as a rendered graphic from the E-Ink viewing side 404. For instance, the first film material layer 420A may comprise a transparent and/or translucent material and the E-Ink particles 428 that are positioned closer to the first film material layer 420A may be visible through this material. The E-Ink particles 428 that are arranged closer to the attachment side 424 may not be visible from the E-Ink viewing side 404. In some embodiments, the appearance of the exterior surfaces 112 of the gaming device 100 may be caused by an electric charge moving a position of one or more of the E-Ink particles 428 in between the film material layers 420A, 420B. Although shown as white and non-white particles, it should be appreciated that the E-Ink particles 428 may be of any color or combination of colors.

Figure 5A:
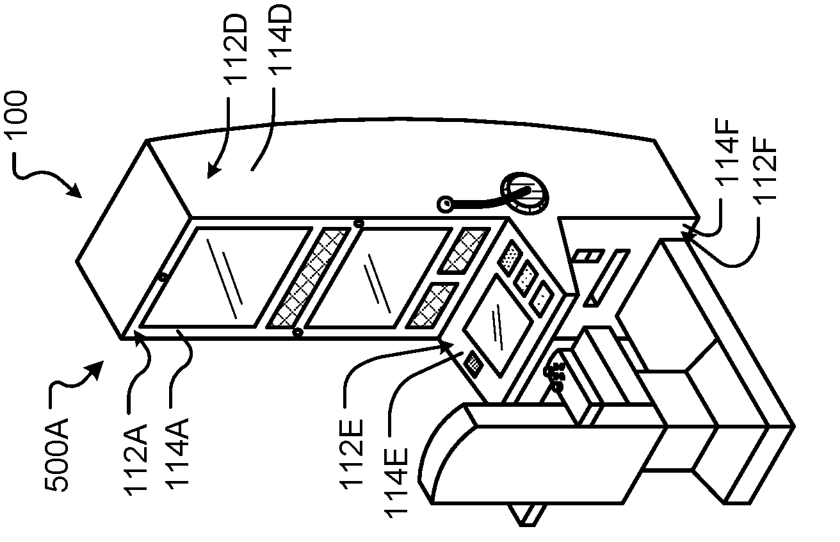
FIG. 5A is a perspective view of a gaming device in a first color state and first surface appearance.
Figure 5B:
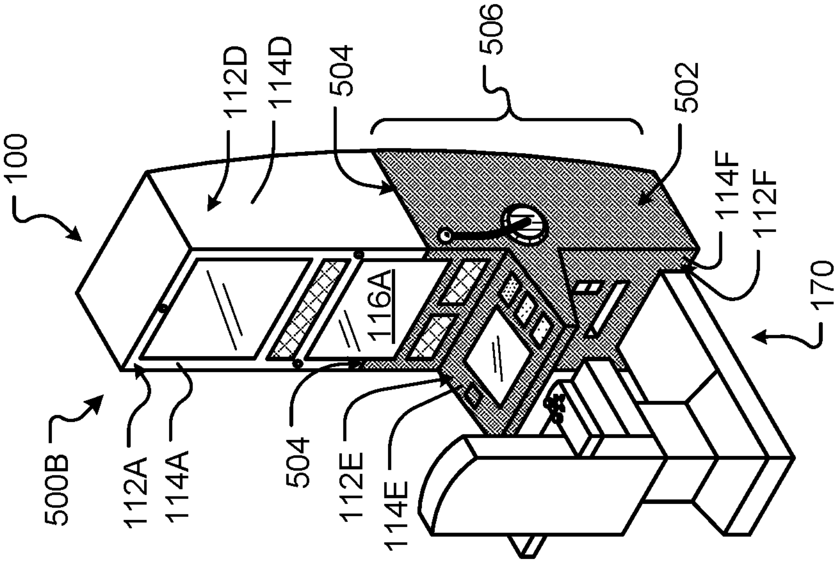
FIG. 5B is a perspective view of a gaming device in a second color state and second surface appearance.
Figure 5C:
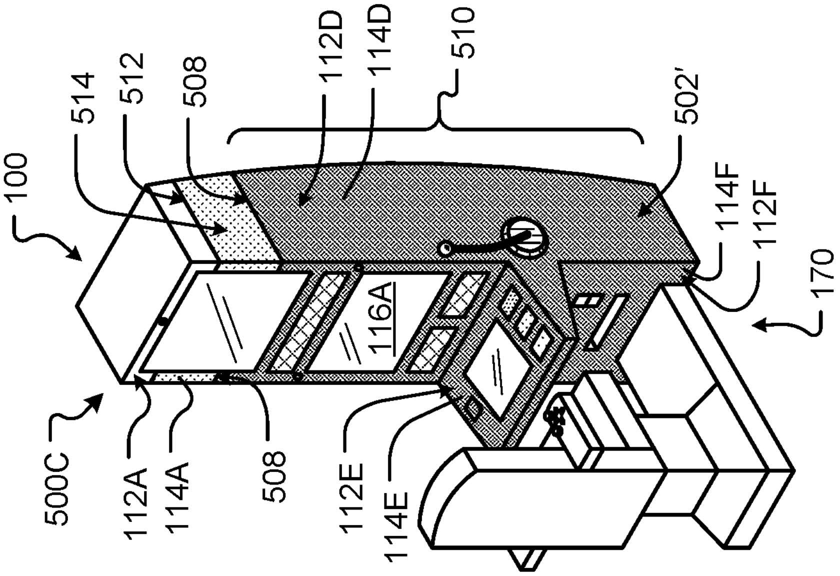
FIG. 5C is a perspective view of a gaming device in a third color state and third surface appearance.

Referring now to FIGS. 5A-5C, a gaming device 100 is shown changing between various color states and/or surface appearances in accordance with embodiments of the present disclosure. In FIG. 5A, the gaming device 100 is shown in a first color state and a first surface appearance 500A. In this first state, the E-Ink film 114 covering one or more of the surfaces 112 of the gaming device 100 may be configured to present no graphics, images, or animations. In one embodiment, the first surface appearance 500A may correspond to a charge of the E-Ink film 114 where the first E-Ink particles 428A are moved adjacent the first film material layer 420A and the second E-Ink particles 428B are moved adjacent the second film material layer 420B.

In FIG. 5B, the gaming device 100 is shown in an altered appearance state from the first surface appearance 500A. More specifically, the gaming device 100 is shown in a second color state and a second surface appearance 500B. In the second surface appearance 500B, the E-Ink control instruction set 228 (e.g., referring to the appearance trigger event information 232, etc.) may determine to change a lower portion of the gaming device 100 to display an image or graphic 502. This image or graphic 502 is shown as a first colored area 506 extending from a bottom 170 of the gaming device 100 to a first level 504 (e.g., located approximately at a middle height of the gaming device 100). As illustrated in FIG. 5B, since the E-Ink film 114 is attached to surfaces that border an area of the first display screen 116A (e.g., the lower display), the image or graphic 502 displayed by the E-Ink film 114 is able to surround, or extend around, the first display screen 116A. The image or graphic 502 is shown displayed across portions of the first surface 112A (e.g., via the first E-Ink film portion 114A), the fourth surface 112D (e.g., via the fourth E-Ink film portion 114D), and over the fifth surface 112E and the sixth surface 112F (e.g., via the fifth E-Ink film portion 114E and sixth E-Ink film portion 114F, respectively). As can be appreciated, the rendering of an image or graphic 502 over surfaces 112 of the gaming device 100 that are disposed adjacent interface elements, buttons, speakers, displays, etc., allows for an enhanced presentation of graphics and/or information that is otherwise unavailable to devices without an E-Ink film 114. Stated another way, conventional devices may only render images to a particular display that is disposed within a portion of the frame of the device, while the present gaming device 100 can render images to any surface of the gaming device 100 where the E-Ink film 114 is attached. In some embodiments, the E-Ink film 114 may cover more than one of the visible surfaces 112 of the gaming device 100. Where the E-Ink film 114 covers each side of the gaming device 100 (e.g., the front, back, left-hand, and right-hand sides), the E-Ink film 114 may render graphics that wrap around an entirety of the gaming device 100. These graphics may be independent of one another or may be continuous and joined to form a single extended graphical image/animation that wraps around the gaming device 100.

In FIG. 5C, the gaming device 100 is shown in another altered appearance state from first surface appearance 500A and an subsequently altered appearance state from the second surface appearance 500B. More specifically, the gaming device 100 in FIG. 5C is shown in a third color state and a third surface appearance 500C. In the third surface appearance 500C, the E-Ink control instruction set 228 (e.g., referring to the appearance trigger event information 232, etc.) may determine to change an appearance of the surfaces 112 of the gaming device 100 to display a modified image or graphic 502'. The modified image or graphic 502' may correspond to the image or graphic 502 that has been extended to cover a greater area of the gaming device 100. For instance, the modified image or graphic 502' is shown rendered to a second colored area 510 that extends from a bottom 170 of the gaming device 100 to a second level 508 (e.g., located above the first level 504 from FIG. 5B). In some embodiments, an additional graphic 514 may be rendered by the E-Ink film 114. The additional graphic 514 may extend from the second level 508 to a third level 512. As shown in FIG. 5C, the modified image or graphic 502' and the additional graphic 514 may extend across multiple surfaces 112 of the gaming device 100. For instance, the modified image or graphic 502' is shown rendered to the first E-Ink film portion 114A, the fourth E-Ink film portion 114D, the fifth E-Ink film portion 114E, and the sixth E-Ink film portion 114F. The additional graphic 514 is shown rendered to the first E-Ink film portion 114A and the fourth E-Ink film portion 114D. The modified image or graphic 502' and/or the additional graphic 514 may be rendered to the back and/or the third surface 112C (not shown) of the gaming device 100 (e.g., via E-Ink film 114 attached thereto). In FIG. 5C, the modified image or graphic 502' is shown completely surrounding the first display screen 116A of the gaming device 100. While the first display screen 116A may render images associated with a game of the gaming device 100, the E-Ink film 114 may render the modified image or graphic 502' to complement the gameplay and/or provide an enhanced player experience.

In some embodiments, the E-Ink film 114 may transition from the first surface appearance 500A to the second surface appearance 500B and then to the third surface appearance 500C in an animation sequence. The animation sequence may be in any order and may be rendered as a pulsation, a cycle, and/or a gradual transition. In some embodiments, the brightness, contrast, and/or colors of the image or graphic 502 and/or the modified image or graphic 502' may change between transitions and surface appearances 500A-500C.

Figure 6B:
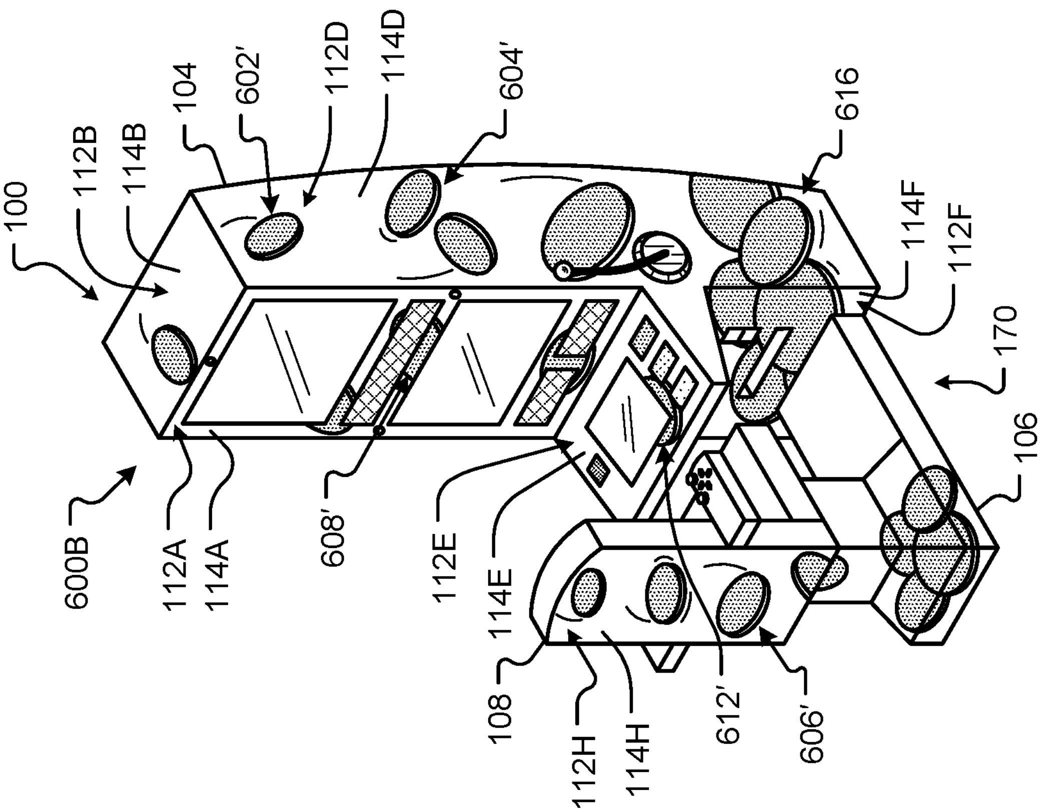
FIG. 6B is a perspective view of a gaming device in a second animation state and second animated surface appearance.
Figure 6A:
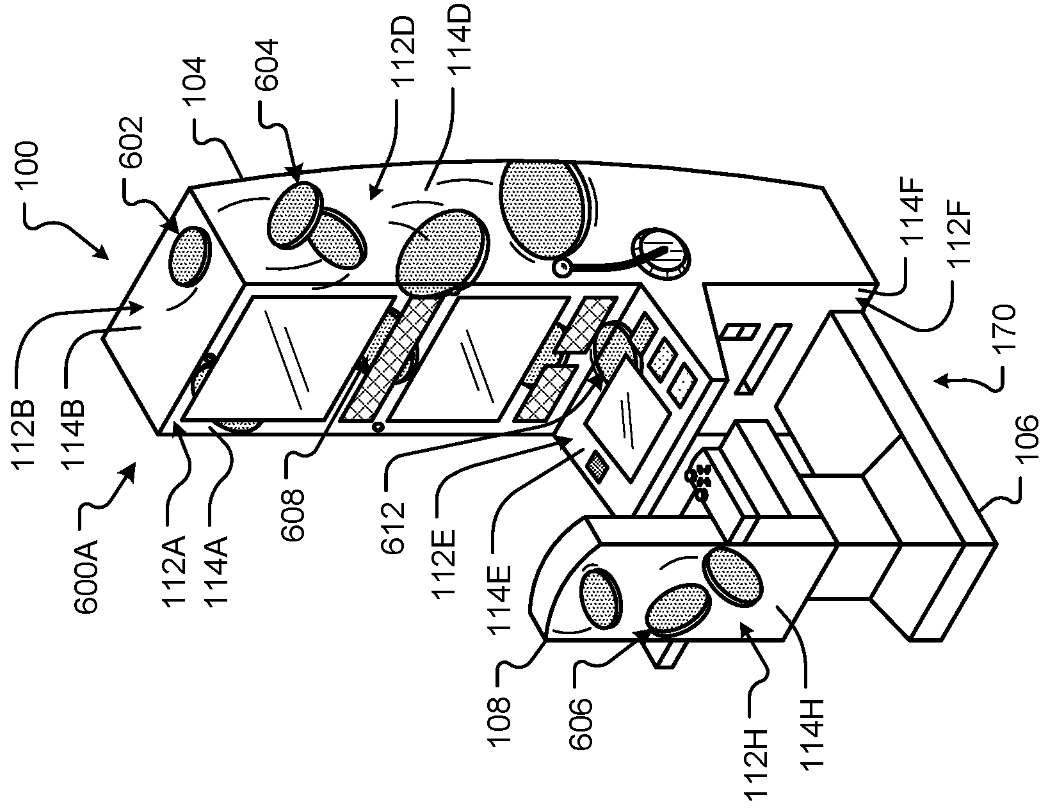
FIG. 6A is a perspective view of a gaming device in a first animation state and first animated surface appearance.

FIGS. 6A-6B show a gaming device 100 displaying an example animation including associated graphics, or display elements, that are rendered to one or more surfaces 112 of the cabinet 104 (e.g., via E-Ink film portions 114A-114H attached thereto). As described above, the gaming device 100 may include an E-Ink film 114 that is attached to various surfaces 112 of the cabinet 104. These surfaces 112 may include, but are in no way limited to, the front, back, sides, and top of the gaming device 100. In some embodiments, these surfaces 112 may be associated with a chair 108, bridge 106, and/or portions thereof. As illustrated in FIGS. 6A and 6B, a plurality of display elements 602-616 may be rendered by one or more of the E-Ink film portions 114A-114H of the E-Ink film 114 attached to the surfaces 112A-112H of the cabinet 104. In some embodiments, as the first animated surface appearance 600A, or first state, (shown in FIG. 6A) transitions to the second animated surface appearance 600B, or second state, (shown in FIG. 6B), one or more of the plurality of display elements 602-612 may move to a different physical viewing position of the E-Ink film portions 114A-114H.

FIG. 6A shows a perspective view of the gaming device 100 in a first animation state and first animated surface appearance 600A. In the first animated surface appearance 600A, a number of display elements 602-616 are shown rendered to various surfaces 112 of the cabinet 104. Specifically, a first display element 602 is shown rendered to the second surface 112B (e.g., via the second E-Ink film portion 114B), a second display element 604 is shown rendered to the fourth surface 112D (e.g., via the fourth E-Ink film portion 114D), a third display element 606 is shown rendered to the eighth surface 112H (e.g., via the eighth E-Ink film portion 114H attached to the chair 108), a fourth display element 608 is shown rendered to the first surface 112A (e.g., via the first E-Ink film portion 114A), and a fifth display element 612 is shown rendered to both the first surface 112A and the fifth surface 112E (e.g., via the first E-Ink film portion 114A and fifth E-Ink film portion 114E, respectively). The display elements 602-616 rendered by the E-Ink film 114 of the gaming device 100 may move, change color, change brightness, change scale, and/or otherwise animate in the first animated surface appearance 600A. In one example, the display elements 602-616 may correspond to images of coins that appear to be falling, or cascading across the surfaces 112 of the gaming device 100, from the top 150 of the gaming device 100 toward the bottom 170 of the gaming device 100.

FIG. 6B shows a perspective view of the gaming device 100 in a second animation state and second animated surface appearance 600B. In the second animated surface appearance 600A, the display elements 602-612 have shifted from the position shown in FIG. 6A (e.g., associated with the first animated surface appearance 600A) to the modified positions 602'-612' shown in FIG. 6B. Additionally or alternatively, an additional sixth display element 616 may be rendered to the E-Ink film 114 of the gaming device 100. In one example, the sixth display element 616 may represent an accumulation of coins that appear to be stacking adjacent the bottom 170 of the gaming device 100. Interestingly, the E-Ink film 114, which may be attached to adjacent surfaces 112 of the gaming device 100, may render a transition of one or more of the display elements 602-612 across corners, bends, and/or surfaces 112 of the gaming device 100. For example, the fifth display element 612, which is shown as being rendered by both the first E-Ink film portion 114A and the fifth E-Ink film portion 114E in FIG. 6A, may transition from the first E-Ink film portion 114A onto the fifth E-Ink film portion 114E, in the modified position of the display element 612' as shown in FIG. 6B. Similarly, the first display element 602, shown as being rendered to the second E-Ink film portion 114B in FIG. 6A may transition to be rendered by the fourth E-Ink film portion 114D in FIG. 6B. Other transitions and animations may be rendered by the various E-Ink film portions 114A-114H of the gaming device 100.

The animation sequence shown in FIGS. 6A-6B may be caused to render by the E-Ink control instruction set 228 referring to the appearance trigger event information 232 and determining that a "winning" trigger event has occurred (e.g., a player has won a game, bonus, award, jackpot, etc.) at the gaming device 100. In response to the "winning" trigger event, the E-Ink control instruction set 228 may determine to cause the E-Ink controller 214 to alter an appearance of the gaming device 100 to display a "raining coins" graphic (as shown in FIGS. 6A-6B). Other graphics and/or presentations may be rendered by the E-Ink film 114 of the gaming device 100 based on the trigger event and/or instructions provided by the E-Ink control instruction set 228.

Figure 7B:
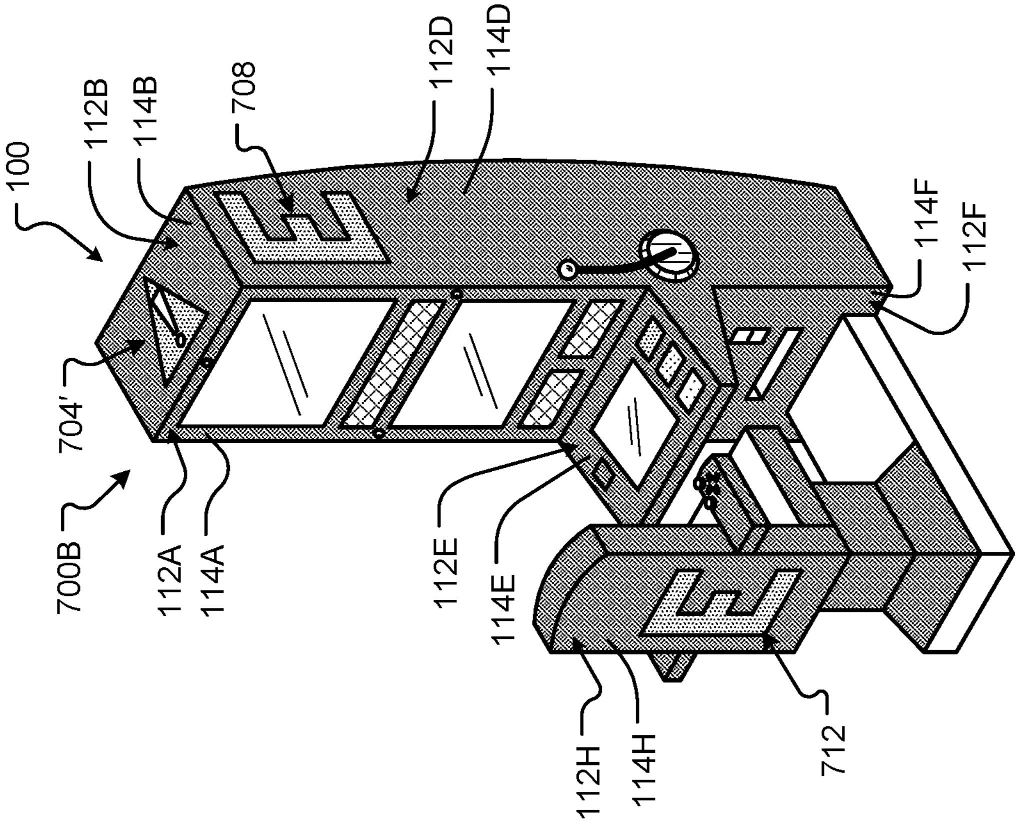
FIG. 7B is a perspective view of a gaming device in a second alert state and second alert surface appearance.
Figure 7A:
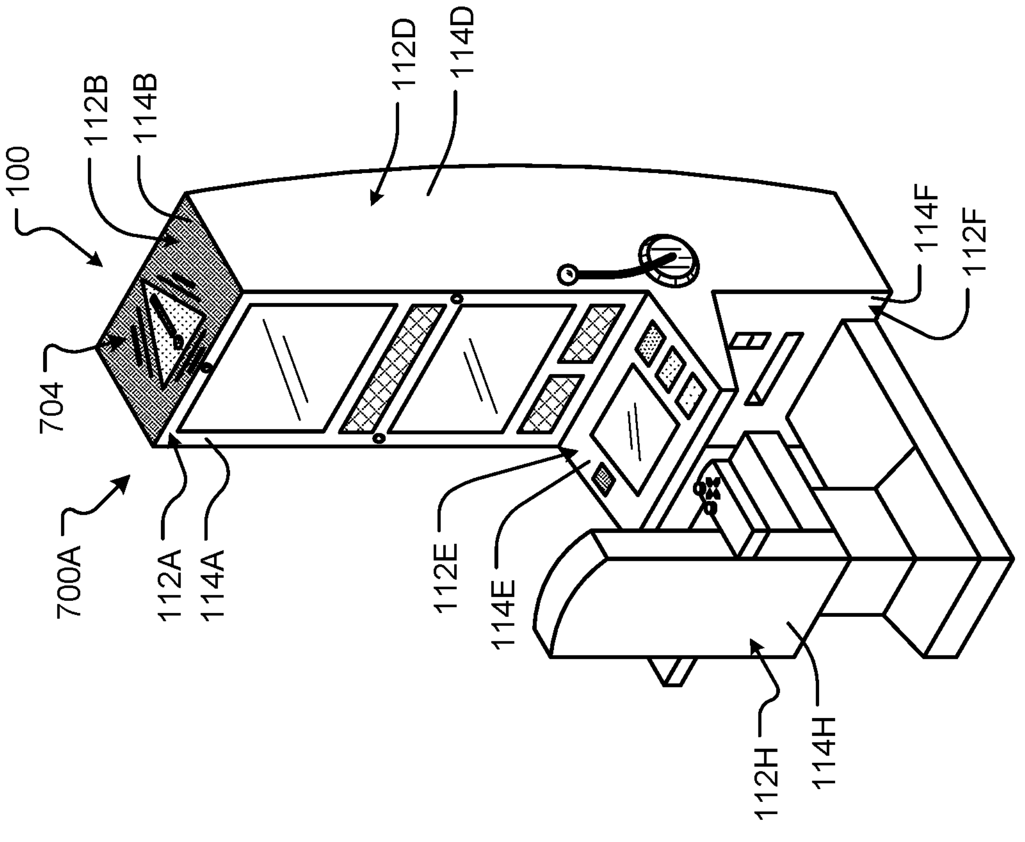
FIG. 7A is a perspective view of a gaming device in a first alert state and first alert surface appearance.

Referring to FIGS. 7A-7B, a gaming device 100 is shown displaying an example alert animation including associated alert graphics, or second display elements, that are rendered to one or more surfaces 112 of the cabinet 104 (e.g., via one or more of the E-Ink film portions 114A-114H attached thereto). The E-Ink film 114 may be attached to one or more of the front, back, side, and top surfaces 112 of the gaming device 100. In some embodiments, these surfaces 112 may be associated with a chair 108, bridge 106, and/or portions thereof. In some embodiments, as the first alert surface appearance 700A, or first state, (shown in FIG. 7A) transitions to the second alert surface appearance 700B, or second state, (shown in FIG. 7B), one or more of the alert display elements 704-712 may flash, appear, disappear, pulsate, change color, change scale, change brightness, change contrast, and/or otherwise animate.

In some embodiments, the first alert surface appearance 700A may correspond to a silent alarm or alert where a first alert display element 704 is rendered by the second E-Ink film portion 114B attached to the second surface 112B on top of the gaming device 100. While the top of the gaming device 100 may be visible to casino management personnel and/or by overhead cameras in a casino, the top of the gaming device 100 may not be visible to a player while playing at the gaming device 100. In one embodiment, the first alert display element 704 may be associated with a "tampering" trigger event where a player has attempted to tamper with the gaming device 100 (e.g., opening a door, tilting a machine, etc.). In some embodiments, this trigger event and/or associated graphic may be stored in the device state information field 316 of the appearance trigger event information data structure 300. In response to the tampering trigger event occurring, the E-Ink control instruction set 228 may cause the E-Ink controller 214 to change an appearance of the gaming device 100 to render images to one or more surfaces 112 of the gaming device 100. In FIG. 7A, the first alert surface appearance 700A is caused to render a first alert display element 704 to the second surface 112B (e.g., via the second E-Ink film portion 114B). The first alert display element 704 is shown as a warning image including a triangle border with an exclamation mark disposed therein. In addition to rendering the first alert display element 704, the second surface 112B is shown as being shaded or colored differently from the other surfaces 112 of the gaming device 100. In some embodiments, this color difference may include a red color, a flashing background, or other animating surface appearance.

In some embodiments, the first alert surface appearance 700A shown in FIG. 7A may transition to a second alert surface appearance 700B as shown in FIG. 7B. Additionally or alternatively, the second alert surface appearance 700B may correspond to a different alert or triggering event associated with the gaming device 100. In any event, and in contrast to the first alert surface appearance 700A of FIG. 7A, the second alert surface appearance 700B of FIG. 7B may render a different appearance to a number of the surfaces 112 of the gaming device 100. In particular, the first E-Ink film portion 114A, the second E-Ink film portion 114B, the fourth E-Ink film portion 114D, the fifth E-Ink film portion 114E, the sixth E-Ink film portion 114F, and the eighth E-Ink film portion 114H may be caused to render an appearance that indicates an alert is associated with the gaming device 100. In FIG. 7B, this appearance is shown as a number of shaded surfaces 112A, 112B, 112D, 112E, 112F, 112H, and alert display elements 704', 708, 712.

As illustrated in FIG. 7B, the fourth E-Ink film portion 114D may display a second alert display element 708 and the eighth E-Ink film portion 114H may display a third alert display element 712. These alert display elements 708, 712 may correspond to a text message, a symbol, an animation and/or other graphical image. For instance, the second alert surface appearance 700B may correspond to an appearance of the gaming device 100 when a trigger event indicates that an alert is intended to be visible by everyone in proximity to the gaming device 100. In one embodiment, the second alert surface appearance 700B may be associated with an "out-of-order" or "error" trigger event (e.g., where the machine has malfunctioned, is inoperable, or otherwise disabled, etc.). In some embodiments, this trigger event and/or associated graphic may be stored in the device state information field 316 or other field 304-312, 320, 324 of the appearance trigger event information data structure 300. In response to the operational state (e.g., device error, device malfunction, etc.) trigger event occurring, the E-Ink control instruction set 228 may cause the E-Ink controller 214 to change an appearance of the gaming device 100 to render one or more alert display elements 708, 712 to one or more surfaces 112 of the gaming device 100 and/or alter an appearance of the one or more surfaces 112 of the gaming device 100.

Figure 8:
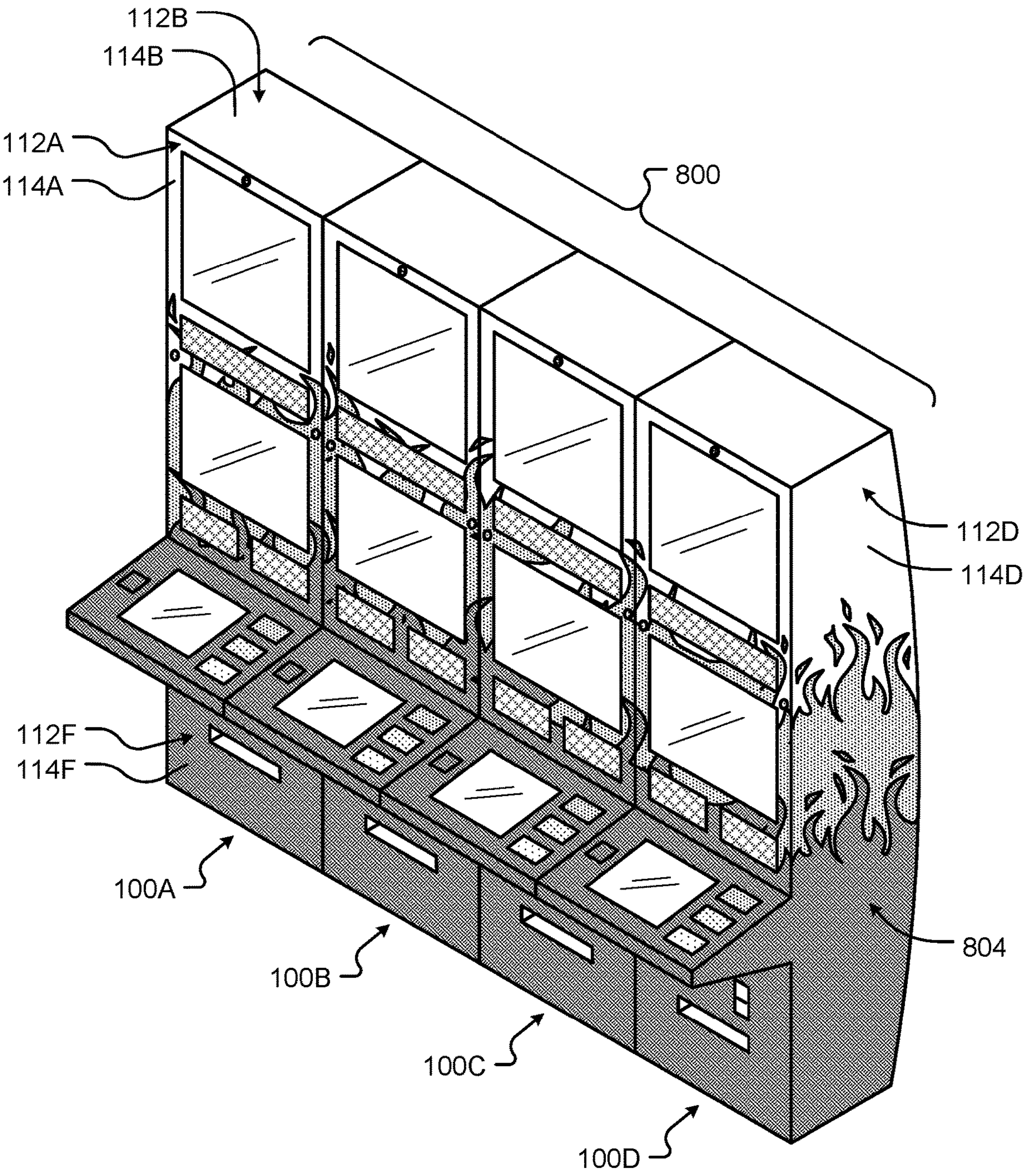
FIG. 8 is a perspective view of a plurality of gaming devices in a joined image state and joined image surface appearances.

FIG. 8 is a perspective view of a row of gaming devices 800 in a joined image state including joined image surface appearances in accordance with embodiments of the present disclosure. The gaming devices 100A-100D shown in FIG. 8 may correspond to the gaming device 100 described above. Some components of the gaming device 100 have been removed from the gaming devices 100A-100D in the row of gaming devices 800 for clarity in disclosure. In some embodiments, a row of gaming devices 800 may be configured, or controlled, to display a graphic or a shared image 804 across multiple gaming devices 100A-100D. For instance, rather than displaying independent images by each gaming device 100A-100D, the row of gaming devices 800 may be controlled together to display a unified image that is split in parts across the surfaces 112 of the gaming devices 100A-100D. Stated another way, the shared image 804 may correspond to a single graphic or animation having a first part rendered by the E-Ink film 114 of the first gaming device 100A, a second part rendered by the E-Ink film 114 of the second gaming device 100B, a third part rendered by the E-Ink film 114 of the third gaming device 100C, and a fourth part rendered by the E-Ink film 114 of the fourth gaming device 100D. In FIG. 8, the shared image 804 may correspond to a “fire” animation, with flames extending across different surfaces 112 of different gaming devices 100A-100D. The “fire” animation may signify that the row of gaming devices 800 are involved in a jackpot, a tournament, are popular, or are paying out at a predetermined amount level. In some embodiments, the shared image 804 may be rendered by the row of gaming devices 800 after a predetermined time of inactivity (e.g., idle time) trigger event. This trigger event and/or associated graphics may be stored in the activity data field 320, or other field 304-316, 324 of the appearance trigger event information data structure 300. In response to the trigger event occurring, the E-Ink control instruction set 228 may cause the E-Ink controller 214 of each of the gaming devices 100A-100D to render the associated graphics in a shared, or joined, manner, as shown in FIG. 8. Other graphics rendered in a joined manner may include, but are in no way limited to, rolling text moving across the gaming devices 100A-100D (e.g., from the fourth gaming device 100D in a direction toward the first gaming device 100A), color changes and/or gradients moving across the gaming devices 100A-100D, flashing lights moving in a sequence across the gaming devices 100A-100D, and/or the like. In some embodiments, a single gaming device 100 of the gaming devices 100A-100D may control, or cause, the shared image 804 to be rendered by the row of gaming devices 800. Additionally or alternatively, a management system server 264 may send a control instruction (e.g., across the communication network 260, etc.) to the row of gaming devices 800 to cause the shared image 804 to be rendered by the row of gaming devices 800.

Figure 9:
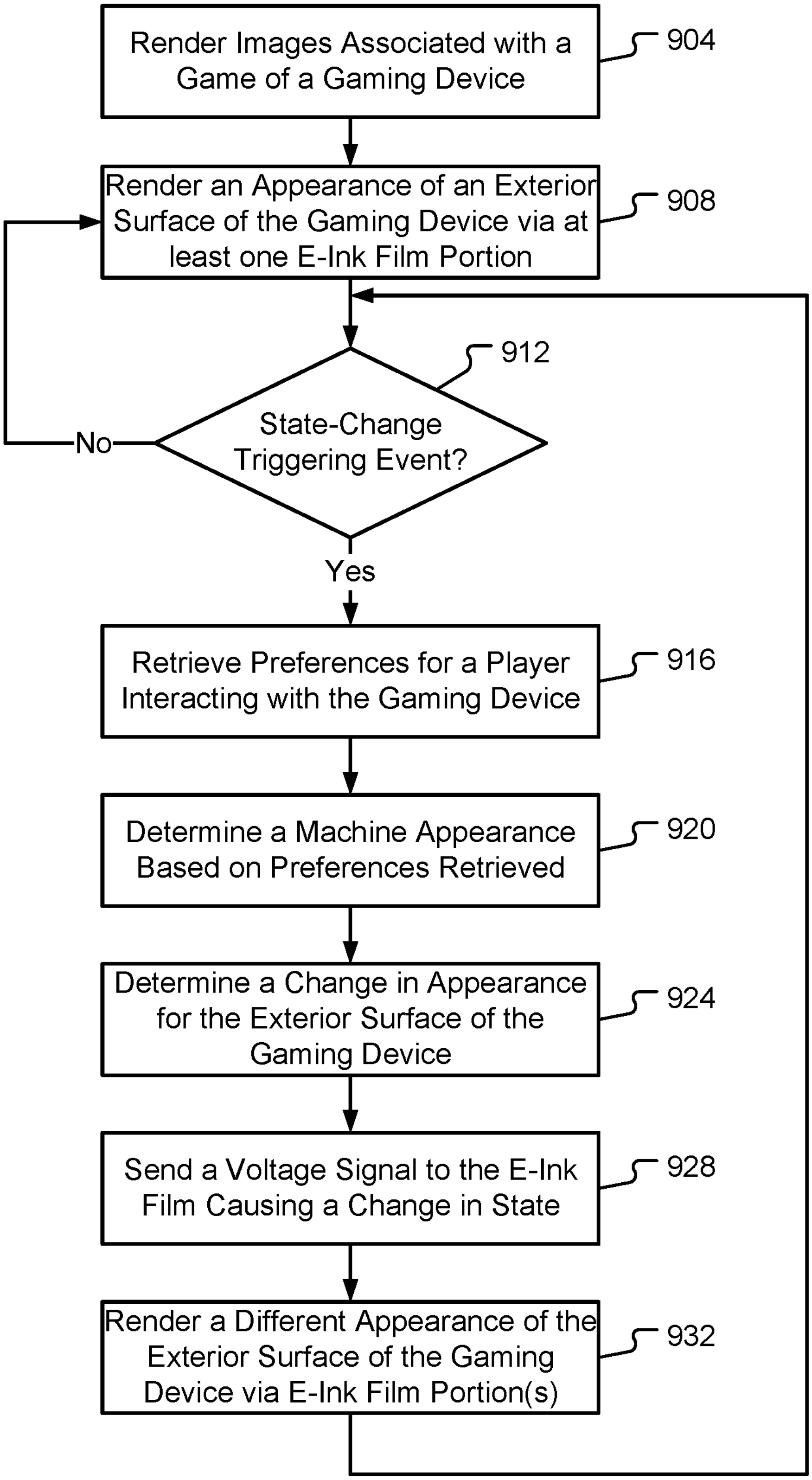
FIG. 9 is a flow diagram of an example process for providing animations and color changes of surfaces of a gaming device.

Referring now to FIG. 9, a flow diagram is shown of an example process for providing animations and color changes of surfaces 112 of a gaming device 100. The methods described herein may be run as a set of instructions on a gaming device 100 and/or a server (e.g., management system server 264, etc.) that manages the behavior and/or operation of one or more gaming devices 100. In some embodiments, the set of instructions may be part of an application installed on the gaming device 100 and/or the server that manages the behavior and/or operation of the gaming devices 100. The method may begin by rendering images associated with a game of the gaming device 100 on a display device (step 904). In some embodiments, the display device may correspond to at least one of the display screens 116A, 116B of the gaming device 100. The display screens 116A, 116B may be disposed at least partially in the frame (e.g., cabinet 104) of the gaming device 100. Each of the display screens 116A, 116B may comprise an outer periphery and a viewing area disposed inside the outer periphery.

Next, the method may proceed by rendering an appearance of an exterior surface 112 of the gaming device 100 via one or more E-Ink film portions 114A-114H of the E-Ink film 114 attached to the surfaces 112 of the gaming device 100 (step 908). The appearance of the surfaces 112 may correspond to any of the appearances described above. In some embodiments, the appearance may include one or more images, graphics, symbols, shades, colors, animations, and/or the like. As described in conjunction with FIGS. 2 and 4, etc., rendering the appearance may include the E-Ink control instruction set 228 causing the E-Ink controller 214 to provide a charge (e.g., voltage, etc.), or change in charge, to the E-Ink film 114 of the gaming device 100.

The method continues by determining whether a state-change triggering event has occurred or is occurring (step 912). The state-change triggering event may correspond to any trigger event described above. One or more of the trigger events may be stored in the appearance trigger event information data structure 300. The gaming device 100 may determine that a trigger event has occurred, or is occurring, based on a signal received from the processor 204, a management system server 264, and/or other device. For example, a world event type of trigger event may be received from the management system server 264 and stored by the gaming device 100 in the appearance trigger event information 232. As another example, when a component of the gaming device 100 reports an operational state, the processor 204 may store the operational state as a device operation state trigger event in the appearance trigger event information 232. As yet another example, when a result of a game played on the gaming device 100 has occurred, the game instruction set 220 may store the result as a game progress type of in the game state information field 308 of the appearance trigger event information data structure 300 in the appearance trigger event information 232. In the event that no state-change triggering event is determined, the method may return to step 908.

Upon determining that a state-change triggering event has occurred, the method may continue by retrieving preferences, and/or other information, for a player interacting with the gaming device 100 (step 916). The preferences of a player may be stored in an account register and/or a player information field 304 of the appearance trigger event information data structure 300 as described in conjunction with FIG. 3. The preferences may include, but are in no way limited to, personalization preferences, an account status, a favorite color, a sports team, an image, a hobby, and an animation that is preferred by, or associated with, the player.

Next, the method may proceed by determining a machine appearance for the gaming device 100 based on the preferences retrieved (step 920). In some embodiments, the E-Ink control instruction set 228 may determine, based on the preferences and/or other information retrieved, that a player prefers a specific team, has a special player account status, and/or enjoys a particular personalization of a gaming device 100 while playing. The machine appearance may include any appearance described above and may include a decoration, image, video, and/or graphics that can be rendered by the E-Ink film 114 of the gaming device 100.

The method may continue by determining a change in appearance for one or more of the surfaces 112 (e.g., exterior surfaces of the gaming device 100) of the gaming device 100 (step 924). The change in appearance may be based on the machine appearance associated with the player preferences and/or other information retrieved and/or may be based on the trigger event detected. In some embodiments, determining the change in appearance may include referring to the appearance trigger event information 232 to determine a corresponding change in appearance associated with the state-change triggering event that occurred. In some embodiments, the change in appearance may be stored in a table or otherwise be associated with specific trigger events (e.g., stored in the appearance trigger event information 232, etc.). The change in appearance may include any appearance described above.

The method continues by sending a voltage signal to the E-Ink film 114 causing a change in state of one or more E-Ink particles 428 of the E-Ink film 114 (step 928). In some embodiments, the E-Ink control instruction set 228 may cause the E-Ink controller 214 to alter, or change, an electric charge of one or more portions of the E-Ink film 114. This change in electric charge may cause specific E-Ink particles 428 of the E-Ink film 114 to move adjacent the first film material layer 420A or to move adjacent the second film material layer 420B. After the electric charge is provided to the E-Ink film 114, the E-Ink film 114 is caused to render a different appearance of one or more surfaces 112 (e.g., exterior surfaces, etc.) of the gaming device 100 (step 932). For instance, the E-Ink film portions 114A-114H of the E-Ink film 114 may render images, graphics, colors, and/or animations that are different from the images, graphics, colors, and/or animations rendered in step 908. The method may end at step 932 or return to step 912. In some embodiments, returning to step 912 allows the method to continue to determine subsequent state-change event triggers and subsequent changes in appearance for the surfaces 112 of the gaming device 100.

Any number of variations and modifications of the disclosure can be used. It would be possible to provide for some features of the disclosure without providing others.

The present disclosure contemplates a variety of different gaming systems each having one or more of a plurality of different features, attributes, or characteristics. A "gaming system" as used herein refers to various configurations of: (a) one or more central servers, central controllers, or remote hosts; (b) one or more electronic gaming machines such as those located on a casino floor; and/or (c) one or more personal gaming devices, such as desktop computers, laptop computers, tablet computers or computing devices, personal digital assistants, mobile phones, and other mobile computing devices. Moreover, an EGM as used herein refers to any suitable electronic gaming machine which enables a player to play a game (including but not limited to a game of chance, a game of skill, and/or a game of partial skill) to potentially win one or more awards, wherein the EGM comprises, but is not limited to: a slot machine, a video poker machine, a video lottery terminal, a terminal associated with an electronic table game, a video keno machine, a video bingo machine located on a casino floor, a sports betting terminal, or a kiosk, such as a sports betting kiosk.

In various embodiments, the gaming system of the present disclosure includes: (a) one or more electronic gaming machines in combination with one or more central servers, central controllers, or remote hosts; (b) one or more personal gaming devices in combination with one or more central servers, central controllers, or remote hosts; (c) one or more personal gaming devices in combination with one or more electronic gaming machines; (d) one or more personal gaming devices, one or more electronic gaming machines, and one or more central servers, central controllers, or remote hosts in combination with one another; (e) a single electronic gaming machine; (f) a plurality of electronic gaming machines in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity and unless specifically stated otherwise, "EGM" as used herein represents one EGM or a plurality of EGMs, "personal gaming device" as used herein represents one personal gaming device or a plurality of personal gaming devices, and "central server, central controller, or remote host" as used herein represents one central server, central controller, or remote host or a plurality of central servers, central controllers, or remote hosts.

As noted above, in various embodiments, the gaming system includes an EGM (or personal gaming device) in combination with a central server, central controller, or remote host. In such embodiments, the EGM (or personal gaming device) is configured to communicate with the central server, central controller, or remote host through a data network or remote communication link. In certain such embodiments, the EGM (or personal gaming device) is configured to communicate with another EGM (or personal gaming device) through the same data network or remote communication link or through a different data network or remote communication link. For example, the gaming system includes a plurality of EGMs that are each configured to communicate with a central server, central controller, or remote host through a data network.

In certain embodiments in which the gaming system includes an EGM (or personal gaming device) in combination with a central server, central controller, or remote host, the central server, central controller, or remote host is any suitable computing device (such as a server) that includes at least one processor and at least one memory device or data storage device. As further described herein, the EGM (or personal gaming device) includes at least one EGM (or personal gaming device) processor configured to transmit and receive data or signals representing events, messages, commands, or any other suitable information between the EGM (or personal gaming device) and the central server, central controller, or remote host. The at least one processor of that EGM (or personal gaming device) is configured to execute the events, messages, or commands represented by such data or signals in conjunction with the operation of the EGM (or personal gaming device). Moreover, the at least one processor of the central server, central controller, or remote host is configured to transmit and receive data or signals representing events, messages, commands, or any other suitable information between the central server, central controller, or remote host and the EGM (or personal gaming device). The at least one processor of the central server, central controller, or remote host is configured to execute the events, messages, or commands represented by such data or signals in conjunction with the operation of the central server, central controller, or remote host. One, more than one, or each of the functions of the central server, central controller, or remote host may be performed by the at least one processor of the EGM (or personal gaming device). Further, one, more than one, or each of the functions of the at least one processor of the EGM (or personal gaming device) may be performed by the at least one processor of the central server, central controller, or remote host.

In certain such embodiments, computerized instructions for controlling any games (such as any primary or base games and/or any secondary or bonus games) displayed by the EGM (or personal gaming device) are executed by the central server, central controller, or remote host. In such "thin client" embodiments, the central server, central controller, or remote host remotely controls any games (or other suitable interfaces) displayed by the EGM (or personal gaming device), and the EGM (or personal gaming device) is utilized to display such games (or suitable interfaces) and to receive one or more inputs or commands. In other such embodiments, computerized instructions for controlling any games displayed by the EGM (or personal gaming device) are communicated from the central server, central controller, or remote host to the EGM (or personal gaming device) and are stored in at least one memory device of the EGM (or personal gaming device). In such "thick client" embodiments, the at least one processor of the EGM (or personal gaming device) executes the computerized instructions to control any games (or other suitable interfaces) displayed by the EGM (or personal gaming device).

In various embodiments in which the gaming system includes a plurality of EGMs (or personal gaming devices), one or more of the EGMs (or personal gaming devices) are thin client EGMs (or personal gaming devices) and one or more of the EGMs (or personal gaming devices) are thick client EGMs (or personal gaming devices). In other embodiments in which the gaming system includes one or more EGMs (or personal gaming devices), certain functions of one or more of the EGMs (or personal gaming devices) are implemented in a thin client environment, and certain other functions of one or more of the EGMs (or personal gaming devices) are implemented in a thick client environment. In one such embodiment in which the gaming system includes an EGM (or personal gaming device) and a central server, central controller, or remote host, computerized instructions for controlling any primary or base games displayed by the EGM (or personal gaming device) are communicated from the central server, central controller, or remote host to the EGM (or personal gaming device) in a thick client configuration, and computerized instructions for controlling any secondary or bonus games or other functions displayed by the EGM (or personal gaming device) are executed by the central server, central controller, or remote host in a thin client configuration.

In certain embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include a local area network (LAN) in which the EGMs (or personal gaming devices) are located substantially proximate to one another and/or the central server, central controller, or remote host. In one example, the EGMs (or personal gaming devices) and the central server, central controller, or remote host are located in a gaming establishment or a portion of a gaming establishment.

In other embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include a wide area network (WAN) in which one or more of the EGMs (or personal gaming devices) are not necessarily located substantially proximate to another one of the EGMs (or personal gaming devices) and/or the central server, central controller, or remote host. For example, one or more of the EGMs (or personal gaming devices) are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs (or personal gaming devices) are located. In certain embodiments in which the communication network includes a WAN, the gaming system includes a central server, central controller, or remote host and an EGM (or personal gaming device) each located in a different gaming establishment in a same geographic area, such as a same city or a same state. Gaming systems in which the communication network includes a WAN are substantially identical to gaming systems in which the communication network includes a LAN, though the quantity of EGMs (or personal gaming devices) in such gaming systems may vary relative to one another.

In further embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include an internet (such as the Internet) or an intranet. In certain such embodiments, an Internet browser of the EGM (or personal gaming device) is usable to access an Internet game page from any location where an Internet connection is available. In one such embodiment, after the EGM (or personal gaming device) accesses the Internet game page, the central server, central controller, or remote host identifies a player before enabling that player to place any wagers on any plays of any wagering games. In one example, the central server, central controller, or remote host identifies the player by requiring a player account of the player to be logged into via an input of a unique player name and password combination assigned to the player. The central server, central controller, or remote host may, however, identify the player in any other suitable manner, such as by validating a player tracking identification number associated with the player; by reading a player tracking card or other smart card inserted into a card reader; by validating a unique player identification number associated with the player by the central server, central controller, or remote host; or by identifying the EGM (or personal gaming device), such as by identifying the MAC address or the IP address of the Internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the Internet browser of the EGM (or personal gaming device). Examples of implementations of Internet-based gaming are further described in U.S. Pat. No. 8,764,566, entitled "Internet Remote Game Server," and U.S. Pat. No. 8,147,334, entitled "Universal Game Server."

The central server, central controller, or remote host and the EGM (or personal gaming device) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs (or personal gaming devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

As should be appreciated by one skilled in the art, aspects of the present disclosure have been illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PUP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure have been described herein with reference to flowchart illustrations and/or block diagrams of methods, apparatuses (systems) and computer program products according to embodiments of the disclosure. It should be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

What is claimed is:

1. A gaming device, comprising:

a frame comprising exterior surfaces of the gaming device;

a display device disposed at least partially in the frame, the display device comprising an outer periphery, wherein a viewing area of the display device is disposed inside the outer periphery;

an electronic-ink film attached to at least one surface of the exterior surfaces of the gaming device, the electronic-ink film arranged outside of the viewing area of the display device, wherein a state of the electronic-ink film defines an appearance of the exterior surfaces of the gaming device, wherein the electronic-ink film bends across two adjacent surfaces of the exterior surfaces of the gaming device, and wherein the two adjacent surfaces are arranged out of plane respective to one another;

a processor coupled to the display device and the electronic-ink film; and a memory coupled with and readable by the processor and storing therein instructions that, when executed by the processor, cause the processor to:

render, via the display device, images associated with a game of the gaming device;

determine, based on an occurrence of a state-change triggering event, a change in the appearance of the exterior surfaces of the gaming device; and send, based on the change in the appearance determined, a first voltage signal to the electronic-ink film, wherein the first voltage signal alters an electric charge of the electronic ink film at a first time that changes the state of the electronic-ink film from a first state comprising a first appearance to a second state comprising a second appearance, and wherein the second appearance is different from the first appearance causing the change in the appearance of the exterior surfaces of the gaming device.

2. The gaming device of claim 1, wherein the electronic-ink film comprises electronic-ink particles sandwiched between layers of a film material of the electronic-ink film, and wherein the change in the appearance of the exterior surfaces of the gaming device is caused by the electric charge moving a position of the electronic-ink particles in between the layers of the film material between the first state and the second state.

3. The gaming device of claim 1, wherein the electronic-ink film surrounds at least a portion of the display device.

4. The gaming device of claim 1, wherein the viewing area of the display device does not extend outside of the outer periphery.

5. The gaming device of claim 1, wherein at least one of the first appearance and the second appearance includes a color change, an image, a video, and an animation that is rendered by the electronic-ink film over time.

6. The gaming device of claim 1, wherein the state-change triggering event comprises at least one of an error state of the gaming device, an idle state of the gaming device, a gameplay state of the gaming device, a wagering state of a game played by the gaming device, a world event, and a personalization preference of a player interacting with the gaming device.

7. The gaming device of claim 6, wherein, prior to determining the change in the appearance of the exterior surfaces of the gaming device, the instructions further cause the processor to:

retrieve, from an account register stored in a memory device, preferences for the player interacting with the gaming device.

8. The gaming device of claim 7, wherein, prior to determining the change in the appearance of the exterior surfaces of the gaming device, the instructions further cause the processor to:

determine, based on the preferences retrieved, a machine appearance that comprises at least one of a favorite color, a sports team, an image, a hobby, and an animation.

9. The gaming device of claim 8, wherein the second appearance includes the machine appearance.

10. The gaming device of claim 1, wherein the instructions further cause the processor to:

determine, based on an occurrence of a subsequent state-change triggering event, a subsequent change in the appearance of the exterior surfaces of the gaming device; and send, based on the subsequent change to the appearance determined, a second voltage signal to the electronic-ink film, wherein the second voltage signal alters an electric charge of the electronic-ink film at a second time that changes the state of the electronic-ink film from the second state comprising the second appearance to a third state comprising a third appearance, and wherein the third appearance is different from the second appearance causing the subsequent change in the appearance of the exterior surfaces of the gaming device.

11. The gaming device of claim 1, wherein the state-change triggering event comprises a tampering event associated with the gaming device, and wherein the second appearance comprises an alert display element to be rendered by a portion of the electronic-ink film.

12. A gaming device, comprising:

a frame comprising exterior surfaces of the gaming device;

a display device disposed at least partially in the frame, the display device comprising an outer periphery, wherein a viewing area of the display device is disposed inside the outer periphery, and wherein the display device is disposed on a first surface of the exterior surfaces of the gaming device;

a player interface device disposed on a second surface of the exterior surfaces of the gaming device, the player interface device comprising at least one of a joystick, a lever, a keyboard, a touchscreen, and a button, wherein the second surface is arranged adjacent to the first surface, and wherein the first surface and the second surface are arranged at a nonzero angle respective to one another;

an electronic-ink film attached to at least one surface of the exterior surfaces of the gaming device, the electronic-ink film arranged outside of the viewing area of the display device, wherein a state of the electronic-ink film defines an appearance of the exterior surfaces of the gaming device, and wherein the electronic-ink film is attached to the second surface, and wherein the electronic-ink film surrounds the player interface device;

a processor coupled to the display device and the electronic-ink film; and a memory coupled with and readable by the processor and storing therein instructions that, when executed by the processor, cause the processor to:

render, via the display device, images associated with a game of the gaming device;

determine, based on an occurrence of a state-change triggering event, a change in the appearance of the exterior surfaces of the gaming device; and send, based on the change in the appearance determined, a first voltage signal to the electronic-ink film, wherein the first voltage signal alters an electric charge of the electronic-ink film at a first time that changes the state of the electronic-ink film from a first state comprising a first appearance to a second state comprising a second appearance, and wherein the second appearance is different from the first appearance causing the change in the appearance of the exterior surfaces of the gaming device.

13. A gaming device, comprising:

a frame defining exterior surfaces of the gaming device;

a display device operatively attached to the frame; and an electronic-ink film overlaying the exterior surfaces of the gaming device, wherein the display device is completely surrounded by the electronic-ink film, wherein the electronic-ink film is separate from the display device, wherein the electronic-ink film comprises electronic-ink particles sandwiched between two opposing film layers of the electronic-ink film, wherein a charge of the electronic-ink particles defines an appearance of the gaming device that is rendered by the electronic-ink film, wherein the electronic-ink film dynamically changes between appearance states based on state-change triggering events received by the gaming device.

14. The gaming device of claim 13, further comprising:

a player interface device attached to the frame, the player interface device comprising at least one of a joystick, a lever, a keyboard, a touchscreen, and a button.

15. The gaming device of claim 14, wherein the player interface device is completely surrounded by the electronic-ink film.

16. The gaming device of claim 15, wherein the display device is disposed on a first surface of the exterior surfaces of the gaming device, and wherein the player interface device is disposed on a second surface of the exterior surfaces of the gaming device.

17. The gaming device of claim 16, wherein the first surface of the exterior surfaces of the gaming device and the second surface of the exterior surfaces of the gaming device are arranged out of plane respective to one another.

18. The gaming device of claim 17, wherein a first portion of the electronic-ink film is attached to the first surface and a second portion of the electronic-ink film that is attached to the second surface, and wherein the appearance of the gaming device comprises an animation that is rendered over time by the first portion of the electronic-ink film and the second portion of the electronic-ink film.

19. The gaming device of claim 13, further comprising:

a speaker that produces audio output of the gaming device, wherein the speaker is completely surrounded by the electronic-ink film.

20. The gaming device of claim 13, further comprising:

a chair that is attached to the frame, wherein a portion of the electronic-ink film is attached to a surface of the chair.

* * * * *